United States Patent
Berrada

(10) Patent No.: US 10,130,915 B2
(45) Date of Patent: Nov. 20, 2018

(54) SELF SUPPORTING STRUCTURE FOR MEMBRANE CROSSFLOW CARTRIDGES

(71) Applicant: ALTO SOLUTION SA, Agadir (MA)

(72) Inventor: Mehdi Berrada, Agadir (MA)

(73) Assignee: ALTO SOLUTION SA, Agadir (MA)

( * ) Notice: Subject to any disclaimer, the term of this patent is extended or adjusted under 35 U.S.C. 154(b) by 174 days.

(21) Appl. No.: 15/023,650

(22) PCT Filed: Sep. 25, 2014

(86) PCT No.: PCT/IB2014/002707
§ 371 (c)(1),
(2) Date: Mar. 21, 2016

(87) PCT Pub. No.: WO2015/044783
PCT Pub. Date: Apr. 2, 2015

(65) Prior Publication Data
US 2016/0207005 A1    Jul. 21, 2016

Related U.S. Application Data

(60) Provisional application No. 61/882,825, filed on Sep. 26, 2013.

(51) Int. Cl.
*B01D 63/00* (2006.01)
*B01D 69/04* (2006.01)
(Continued)

(52) U.S. Cl.
CPC .......... *B01D 69/04* (2013.01); *B01D 61/025* (2013.01); *B01D 61/08* (2013.01); *B01D 63/12* (2013.01);
(Continued)

(58) Field of Classification Search
CPC .................. B01D 29/52; B01D 2265/024; B29C 47/687; C02F 1/444
(Continued)

(56) References Cited

U.S. PATENT DOCUMENTS 5,108,601 A * 4/1992 Goldsmith ............. B01D 29/05
                                                            210/247
5,200,077 A * 4/1993 McNeice ............... B01D 29/15
                                                            210/323.2
(Continued)

FOREIGN PATENT DOCUMENTS

CN    1964775 A    5/2007
EP    1335162 A2   8/2003
(Continued)

OTHER PUBLICATIONS

PCT/IB2016/000884 International Search Report and Written Opinion dated Sep. 12, 2016.
(Continued)

*Primary Examiner* — Ana M Fortuna
(74) *Attorney, Agent, or Firm* — Wilson Sonsini Goodrich & Rosati

(57) ABSTRACT

Self-supporting structure comprising a monobloc for installing cylindrical filtration cartridges therein. In one embodiment a structure provides two side panels on each side of the monobloc used for sealing the numerous passageways, at the same time, provided within the monobloc. Such a structure aims to sharply reduce the number of components required to install cylindrical filtration cartridges in a filtration plant, while keeping the same number of cartridges. Thus the invention contributes to highly reduce the investment and the maintenance costs of a filtration plant, and offers also the opportunity to reduce the operational cost of such a plant.

18 Claims, 16 Drawing Sheets

(51) Int. Cl.
*B01D 61/08* (2006.01)
*B01D 63/12* (2006.01)
*B01D 65/00* (2006.01)
*C02F 1/44* (2006.01)
*B01D 61/02* (2006.01)

(52) U.S. Cl.
CPC .............. *B01D 65/00* (2013.01); *C02F 1/441* (2013.01); *B01D 2313/06* (2013.01); *B01D 2313/105* (2013.01); *B01D 2313/125* (2013.01); *B01D 2313/20* (2013.01); *B01D 2317/022* (2013.01)

(58) Field of Classification Search
USPC .................... 210/232, 330, 456, 321.74, 652
See application file for complete search history.

(56) References Cited

U.S. PATENT DOCUMENTS

| | | | | |
|---|---|---|---|---|
| 7,316,780 | B1* | 1/2008 | Fendya | A23C 9/1422 210/503 |
| 8,673,148 | B2* | 3/2014 | Straeffer | B01D 63/103 210/321.83 |
| 8,828,233 | B2* | 9/2014 | Said | C02F 1/441 210/321.6 |
| 2005/0072726 | A1* | 4/2005 | Laub | B01D 29/111 210/330 |
| 2008/0093275 | A1* | 4/2008 | Brown | B01D 61/08 210/86 |

FOREIGN PATENT DOCUMENTS

| | | |
|---|---|---|
| EP | 3049177 A2 | 8/2016 |
| JP | H1024221 A | 1/1998 |
| JP | 2013052318 A | 3/2013 |
| WO | WO-9823361 A1 | 6/1998 |
| WO | WO-0004985 A1 | 2/2000 |
| WO | WO-0230550 A1 | 4/2002 |
| WO | WO-2005105274 A1 | 11/2005 |
| WO | WO-2006017887 A1 | 2/2006 |
| WO | WO-2009136165 A1 | 11/2009 |
| WO | WO-2011149626 A1 | 12/2011 |
| WO | WO-2012006362 A2 | 1/2012 |
| WO | WO-2012105835 A1 | 8/2012 |
| WO | WO-2013080623 A1 | 6/2013 |
| WO | WO-2015044783 | 4/2015 |
| WO | WO-2015044783 A2 | 4/2015 |
| WO | WO-2016151408 A2 | 9/2016 |

OTHER PUBLICATIONS

Chinese Patent Application No. 2014800640951 First Office Action dated Jul. 3, 2017.
PCT/IB2014/002707 International Search Report and Written Opinion dated Mar. 17, 2015.
PCT Patent Application No. PCT/IB2014/002707 International Preliminary Report on Patentability dated Apr. 7, 2016.
Australia Patent Application No. 2014326293 Examination Report No. 1 dated Nov. 17, 2017.
PCT/US2016/000884 International Preliminary Report on Patentabilty dated Oct. 5, 2017.

* cited by examiner

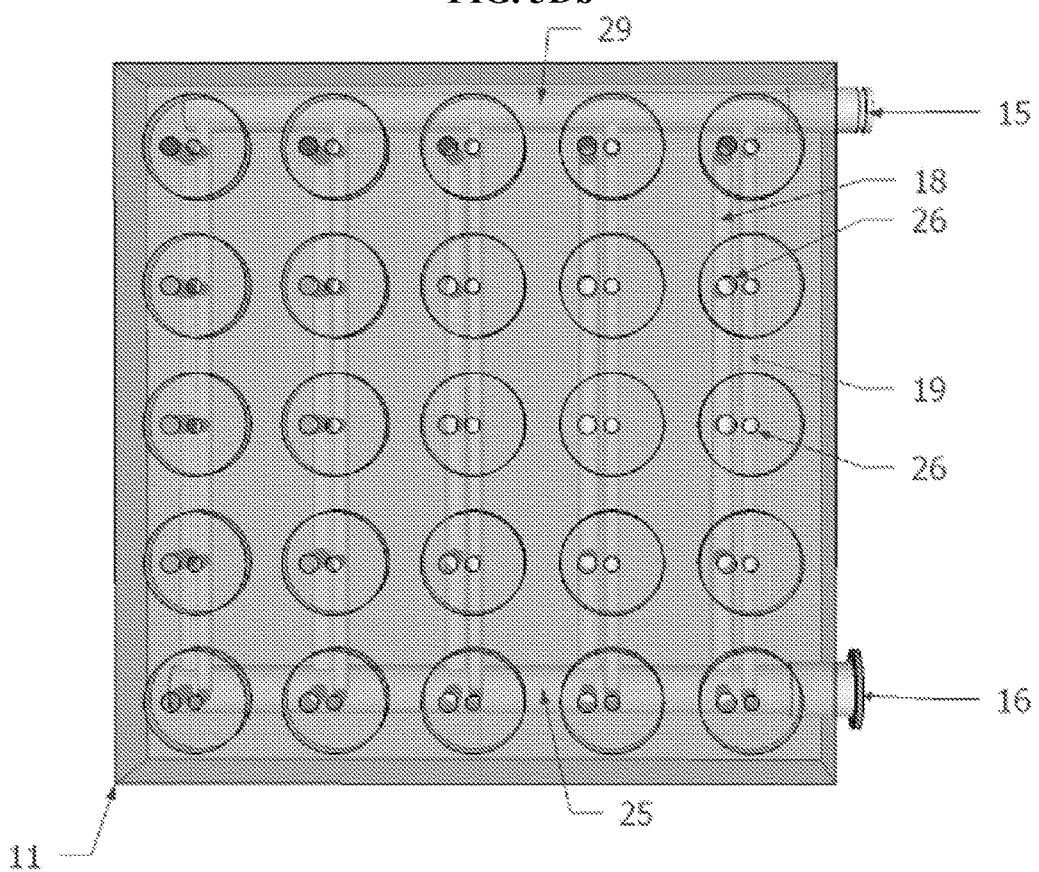

SELF SUPPORTING STRUCTURE FOR MEMBRANE CROSSFLOW CARTRIDGES

CROSS-REFERENCE

This application is filed pursuant to 35 U.S.C. § 371 as a United States National Phase Application of International Application Ser. No. PCT/IB2014/002707, filed Sep. 25, 2014, which claims the benefit under 35 U.S.C. § 119(e) of U.S. Provisional Application No. 61/882,825 filed Sep. 26, 2013, the contents of which is incorporated herein by reference in its entirety.

FIELD OF THE INVENTION

The present invention relates to the field of reverse osmosis and other filtration processes useful for removing suspended and/or dissolved solids from a feed liquid stream.

BACKGROUND OF THE INVENTION

To date much work has been done in the desalination area. For example, WO9735125 purports to improve the end-closures of the pressure vessels. Efforts were devoted to protect pressure vessels with side ports: e.g. EP1335162. For example, WO2013080623 purports to provide improved pressure vessels with side ports, however, the pressure tubes are specially designed to withstand the ellipsoidal strains.

WO2005105274 discloses an assembly of pressure vessels with side ports, this disclosure purports to provide for the protection of an assembly of several pressure vessels; wherein the pressure vessels have the characteristic of being supplied with raw water in the middle position, in contrast to conventional pressure vessels which are fed at one end opening or the other.

WO2011149626 purports to reduce clogging problems due to precipitation of dissolved solids within cylindrical filtration cartridges. To design pressure vessels that can be supplied with raw water at one end, and at the same time at the center of the tubes. Thus the concentration of the cross-membrane concentrate, which is the feed liquid of the next membrane, is sharply reduced, which reduces the risk of clogging by precipitation of dissolved solids, and which also reduces the feed pressure.

WO2012006362 purports to reduce the number of components, and thus the pressure vessels, while installing the same number of cylindrical filtration cartridges. The difference of this patent with our invention is that the use of pressure vessels is kept. Although vessels are larger, and are equivalent to 7 current pressure vessels, these tubes retain all the characteristics of the current reverse osmosis racks: the tubes are independent of each other, they are mounted on a steel structure, and require stainless steel piping to connect to each other. Furthermore, this patent has also a special feature at the first claim: each membrane of the same series in the same pressure tube is fed with raw water, in order to reduce the concentration of the inlet fluid on the latest cylindrical filtration cartridges.

SUMMARY OF THE INVENTION

Provided herein is a structure for enclosure of cylindrical filtration cartridges such as, but not limited to Reverse Osmosis (RO), Nanofiltration (NF), Ultrafiltration (UF), and Electrodionisation (EDI) modules. In one embodiment, the structure, substantially built of solid material, allows for simplifying the high-pressure part of filtration processes.

One embodiment relates to a structure for enclosure of cylindrical filtration cartridges. In such embodiment, the structure aims to sharply reduce the number of components required to install cylindrical filtration cartridges in a filtration plant, while keeping the same number of cartridges.

The structures provided herein fulfill basic functions such as: installing the cylindrical filtration cartridges, feeding them with raw water, and separately collecting the concentrate and the permeate. The structures disclosed herein allow for replacing the cylindrical filtration cartridges, and facilitate their reliable maintenance The structures disclosed herein provide numerous advantages. For example, rather than considering the installation of each series of cylindrical filtration cartridges independently, within pressure vessels independent one from each other, which need to be installed on a steel frame, and then being connected together by means of stainless steel piping, the structures disclosed herein allow for installing the cylindrical filtration cartridges in a self-supporting monobloc structure.

The self-supporting features of the structures disclosed herein eliminate the need for steel frame. The monobloc feature eliminates the need of stainless steel piping; wherein hydraulic connections being arranged within the structure itself.

Thus, the monobloc and self-supporting features significantly reduce the number of components needed to install the cylindrical filtration cartridges, while avoiding the main issues responsible for leaks and corrosion: hydraulic connections, stainless steel piping and steel frame.

The monobloc features simplify the inspection and maintenance of the cylindrical filtration cartridges as operators no longer need to open each pressure vessel separately, and can access all the cylindrical filtration cartridges upstream, or downstream, in the same structure, with a simple operation. This reduces the arduous nature and above all the time needed for maintenance.

The advantageous structures provided herein simplify the complete value chain for building the high-pressure part of the filtration processes, which helps to greatly reduce the investment costs relating thereto.

Moreover, the structures allow for limiting leakage and corrosion, and the shorter maintenance procedures help to significantly reduce maintenance costs.

The monobloc feature of the structure which comprises all the hydraulic connections therein, as internal channels, also offers the possibility of reducing the operation cost of these filtration processes.

One embodiment provides a self-supporting structure comprising a monobloc having at least two axial passageways extending between opposite end openings; wherein at least one cylindrical filtration cartridge is fitted in each passageway, so a feed liquid having dissolved and/or suspended therein components flows through the cylindrical filtration cartridges to create a permeate stream and a concentrate stream which are both separately collected.

One embodiment provides a self-supporting structure wherein the monobloc is built in one single bloc or is an assemblage of several blocs comprising at least one passageway each.

One embodiment provides a self-supporting structure wherein at least two cylindrical filtration cartridges are fitted in series in each passageway. One embodiment provides a self-supporting structure for which two side panels are provided for sealing both the end openings of the passageways in a manner to allow the insertion and removal of the cylindrical filtration cartridges.

One embodiment provides a self-supporting structure wherein the feed liquid is introduced, either at one end opening or at the center of the structure, thereby placing a feed side at one end opening or at the center of the structure.

One embodiment provides a self-supporting structure wherein the feed liquid is directed into the near end of the cylindrical filtration cartridges disposed at the feed side of the passageways.

One embodiment provides a self-supporting structure wherein the number of passageways is determined according to the flow of the feed liquid that can be processed by each of the cylindrical filtration cartridges that are located upstream the passageways.

One embodiment provides a self-supporting structure wherein the feed liquid is evenly distributed into the passageways through internal channels that are located in the monobloc or in one of the side panels.

One embodiment provides a self-supporting structure wherein the concentrate flows out from each of the passageways at the end opening opposite the feed side, or out of both the end openings in case the feed side is at the center of the structure.

One embodiment provides a self-supporting structure wherein the concentrate flowing out from each of the passageways is combined into one common concentrate stream.

One embodiment provides a self-supporting structure wherein the permeate flows out of the passageways at either one or the other the end opening, regardless of the feed side being located at the center of the structure or at one the end opening.

One embodiment provides a self-supporting structure wherein the permeate flowing out from each of the passageways is combined into one common permeate stream.

One embodiment provides a self-supporting structure wherein the feed liquid flows through the cylindrical filtration cartridges fitted in the passageways in parallel in order to achieve a single-stage filtration.

One embodiment provides a self-supporting structure wherein the monobloc comprises at least two passageways connected in series by internal channels, in order to achieve multi-stage filtration.

One embodiment provides a self-supporting structure wherein the monobloc and/or the side panels comprise at least one internal channel for directing the feed liquid to a plenum chamber located at the middle of the passageways, in order to lower the concentration of the fluid feeding the last cylindrical filtration cartridges of the series. Whether the filtration is mono or multi-stage, whether it is the first or any stage of filtration.

One embodiment provides a self-supporting structure wherein the material used for its construction allows the structure to withstand operating conditions comprising:
  A. nominal superatmospheric pressure: up to 1500 psi;
  B. feed liquid salinity: up to 60 ppm; and/or
  C. use of strong acid and caustic.

One embodiment provides a self-supporting structure wherein the monobloc and the side panels are made of corrosion-resistant alloys, plastic materials, composites, polymers, resins, concrete, or nano-materials.

One embodiment provides a self-supporting structure wherein the materials are fiber-reinforced.

One embodiment provides a self-supporting structure wherein the materials comprise adjuvants; those adjuvants may contain nanoparticles or not.

One embodiment provides a self-supporting structure wherein an internal frame is provided within the monobloc and/or the side panels, in order to reinforce the mechanical strength.

One embodiment provides a self-supporting structure wherein the diameter of the passageways is determined by the diameter of the cylindrical filtration cartridges, such that the annular seals surrounding the cylindrical filtration cartridges provide sealing between the periphery areas of each the cylindrical filtration cartridges and an inner tubular surface of the structure that defines the passageways, thereby forcing the feed liquid to pass through the cylindrical filtration cartridges.

One embodiment provides a self-supporting structure wherein the length of the monobloc depends on the number of the cylindrical filtration cartridges to be placed in series in the passageways.

One embodiment provides a self-supporting structure wherein the width and the height of the structure depend on the number of the passageways within the structure and their diameters, and depend as well on the material used for its construction.

One embodiment provides a self-supporting structure for which:
  A. The feed liquid is introduced into the structure through at least one feed entry port, so that a pipe or an isolation valve can be connected to it.
  B. The common concentrate stream is linked to at least one concentrate exit port, so that a pipe, an isolation valve or a regulation valve can be connected to it.
  C. The common permeate stream is linked to at least one permeate exit port, so that a pipe or an isolation valve can be connected to it.

One embodiment provides a self-supporting structure for which sample ports are provided on either or both the side panels, in order to install sample valves that will be used to take permeate samples separately on each permeate sub-stream flowing out from each the passageway.

One embodiment provides a self-supporting structure wherein tappings are made either in the monobloc or in the side panels in order to install instrumentation for controlling all the qualitative and quantitative parameters of the feed liquid, the concentrate or the permeate.

One embodiment provides a method for treating a feed liquid having dissolved and/or suspended therein components using cross-flow single-stage filtration to create a permeate stream and a concentrate stream, which method comprises the steps of:
  A. feeding a stream of such liquid through a feed entry port located either on the monobloc or on the side panels;
  B. splitting the feed stream into even feed sub-streams; the number of the feed sub-streams is equal to the number of the passageways within the monobloc;
  C. introducing each the feed sub-stream into a the passageway;
  D. directing each the feed sub-stream into the near end of the cylindrical filtration cartridges disposed at the feed side of the passageways;
  E. separately collecting the concentrate sub-streams exiting from each the cylindrical filtration cartridge at the end opening opposite the feed side of each the passageway;
  F. combining together all the concentrate sub-streams into at least one common concentrate stream;

G. separately collecting the permeate sub-streams exiting from the cylindrical filtration cartridges at either or both end openings of the passageways;

H. combining together every the permeate sub-streams into at least one common permeate stream.

One embodiment provides a method for treating a feed liquid having dissolved and/or suspended therein components using cross-flow multi-stage filtration to create a permeate stream and a concentrate stream, which method comprises the steps of:

A. feeding a stream of such liquid through a feed entry port located either on the monobloc or on the side panels;

B. splitting the feed stream into even feed sub-streams; the number of the feed sub-streams is equal to the number of the passageways within the monobloc that are used for the first stage;

C. introducing each the feed sub-stream into a the passageway used for the first stage;

D. directing each the feed sub-stream into the near end of the cylindrical filtration cartridges disposed at the feed side of the passageways used for the first stage;

E. separately collecting the inter-stage concentrate sub-streams exiting from each the cylindrical filtration cartridge at the end opening opposite the feed side of each the passageway used for the first stage;

F. combining together all the inter-stage concentrate sub-streams into at least one common inter-stage concentrate stream;

G. splitting the common inter-stage concentrate stream into even inter-stage concentrate sub-streams; the number of the inter-stage concentrate sub-streams is equal to the number of the passageways within the monobloc that are used for the next stage;

H. introducing each the inter-stage concentrate sub-stream into a the passageway used for the next stage;

I. directing each the inter-stage concentrate sub-stream into the near end of the cylindrical filtration cartridge disposed at the feed side of the passageway used for the next stage;

J. separately collecting the final concentrate sub-streams exiting from each the cylindrical filtration cartridge at the end opening opposite the feed side of each the passageway used for the final stage;

K. combining together all the final concentrate sub-streams into at least one common final concentrate stream;

L. separately collecting the permeate sub-streams exiting from the cylindrical filtration cartridges at either or both end openings of each the passageway used for any stage;

M. combining together every the permeate sub-streams into at least one common permeate stream;

N. operations 28E. to 28I. can be repeated many times so multi-stage filtration can be achieved.

One embodiment provides a method wherein the common concentrate streams exit the structure via at least one concentrate exit port located either on the monobloc or on the side panels.

One embodiment provides a method wherein the common permeate streams exit the structure via at least one permeate exit port located either on the monobloc or on the side panels.

One embodiment provides a method wherein each stream flowing through the cylindrical filtration cartridges is directed through a plurality of the filtration cylindrical cartridges disposed in serial arrangement in the passageways.

BRIEF DESCRIPTION OF THE DRAWINGS

FIG. 2: Monobloc having 2 passageways wherein one cylindrical filtration cartridges is fitted.

FIG. 3: Structure with a monobloc of 25 passageways in parallel, and wherein distribution of feed water and collection of concentrate and permeate is done within the side panels.

FIG. 3Ca: Side view showing the organization of the internal channels within the side panel.

FIG. 3Cb: Front view showing the organization of the internal channels as well as the feedholes within the side panel.

FIG. 3Da: Side view showing the organization of the internal channels within the side panel.

FIG. 3Db: Front view showing the organization of the internal channels as well as the concentrate and permeate collection holes within the side panel.

FIG. 4: Structure with a monobloc of 25 passageways in parallel, and wherein distribution of feed water and collection of concentrate is done within the monobloc while permeate is collected within a side panel.

FIG. 4Da: Detailed transparent view on the internal channels used for sampling each different permeate sub-stream.

FIG. 4Db: Rear view showing the permeate sample ports.

FIG. 4Dc: Front view showing the permeate holes.

FIG. 5: Monobloc of 8 passageways from each side of a central feed inlet port.

FIG. 6: Assembly of blocs for building a monobloc.

FIG. 7: Structure with a monobloc of 25 passageways arranged in a 3-stage filtration; 10 passageways constitute the $1^{st}$ stage, 10 other constitute the $2^{nd}$ stage, while the last 5 constitute the $3^{rd}$ stage.

FIG. 8: Structure with a monobloc of 4 passageways in parallel, where the feed liquid is introduced into the cylindrical filtration cartridges placed upstream, and in the middle of the series.

DETAILED DESCRIPTION OF THE INVENTION

One embodiment provides a self-supporting structure comprising a monobloc having at least two axial passageways extending between opposite end openings; wherein at least one cylindrical filtration cartridge is fitted in each passageway, so a feed liquid having dissolved and/or suspended therein components flows through the cylindrical filtration cartridges to create a permeate stream and a concentrate stream which are both separately collected.

Figure 2A:
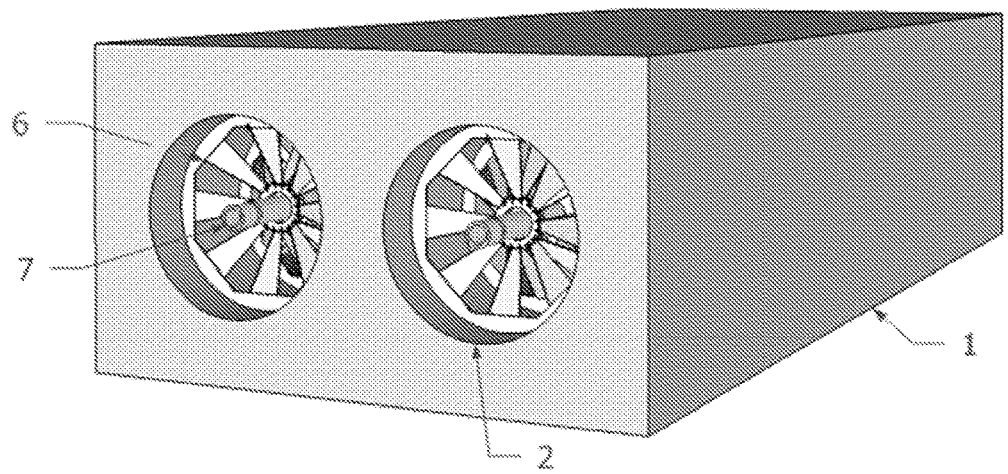
FIG. 2A: 3D view of the monobloc.
Figure 2B:
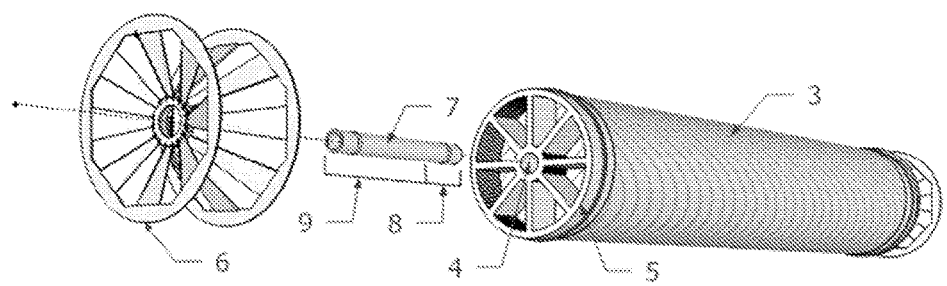
FIG. 2B: Transparent view of the monobloc and details of the cylindrical filtration cartridge, the permeate outlet fitting and the spacer.
Figure 2B:
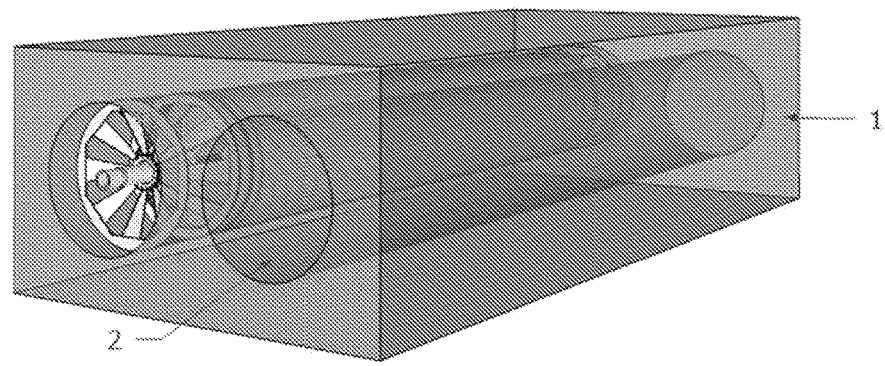
Figure 3A:
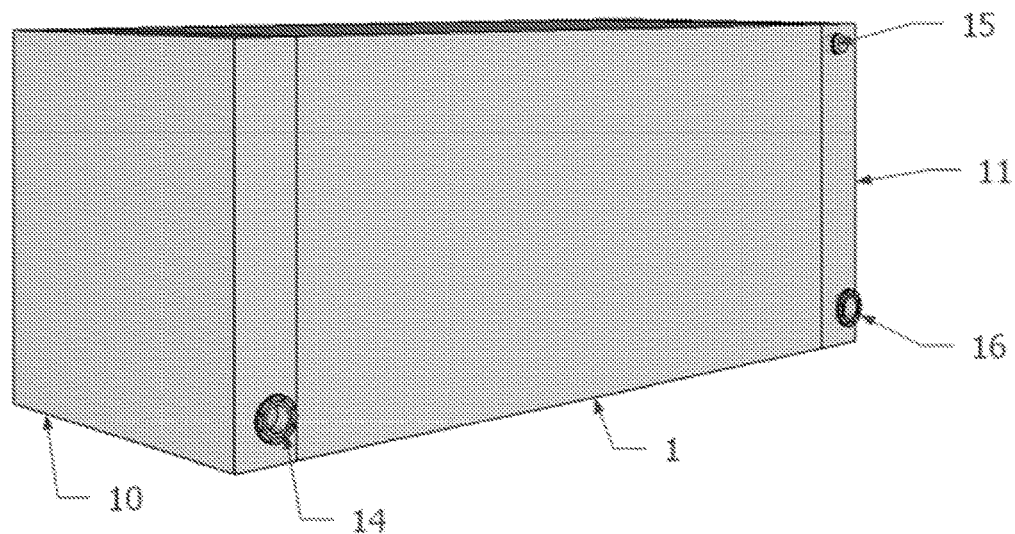
FIG. 3A: 3D view of the complete structure.
Figure 3B:
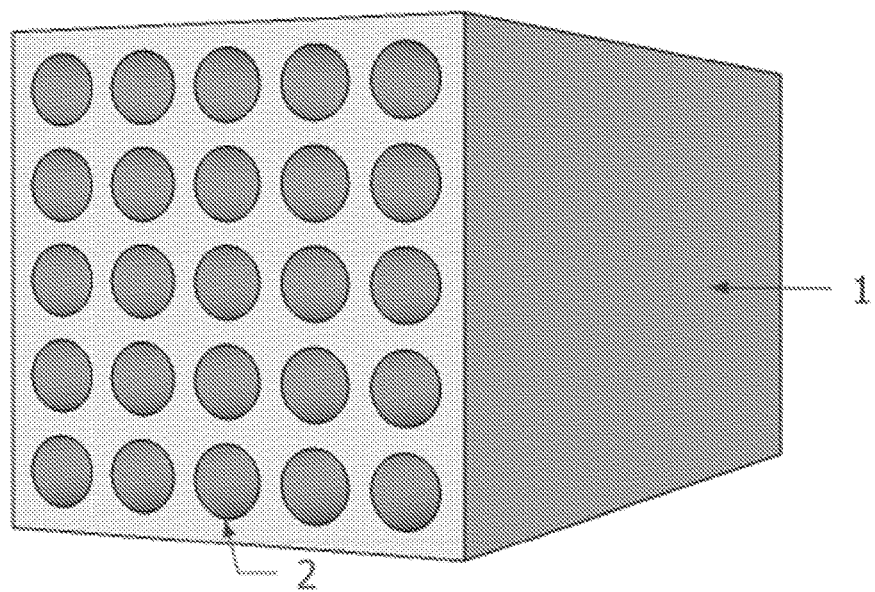
FIG. 3B: 3D view of the monobloc and its 25 passageways.
Figure 3C:
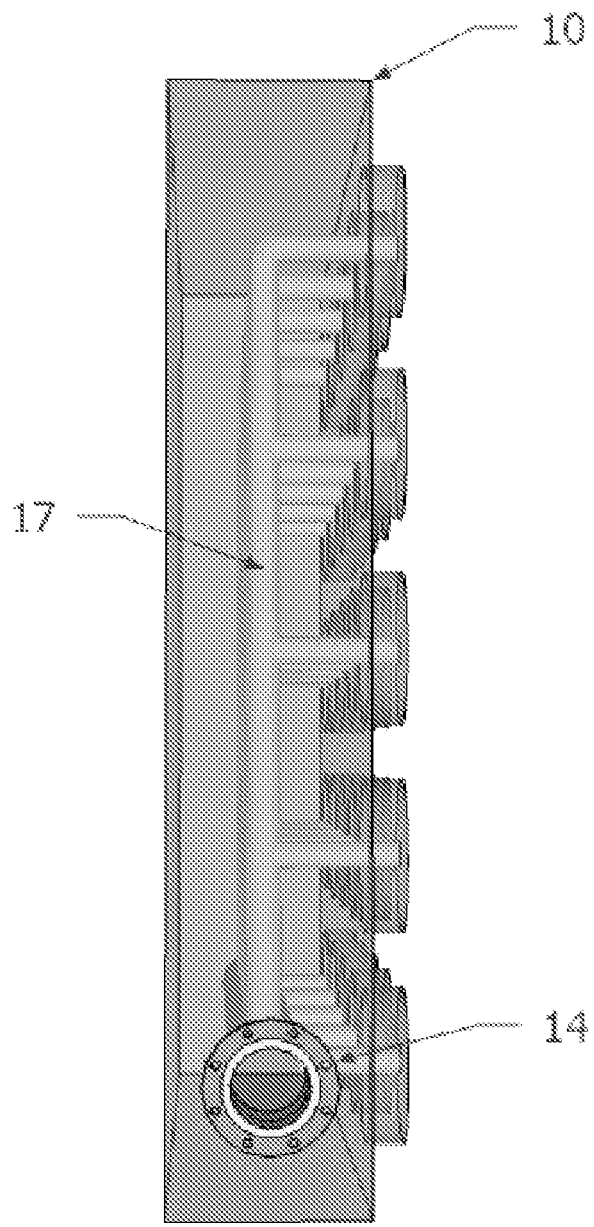
FIG. 3C: Transparent view of the side panel used to feed the monobloc.
Figure 3C:
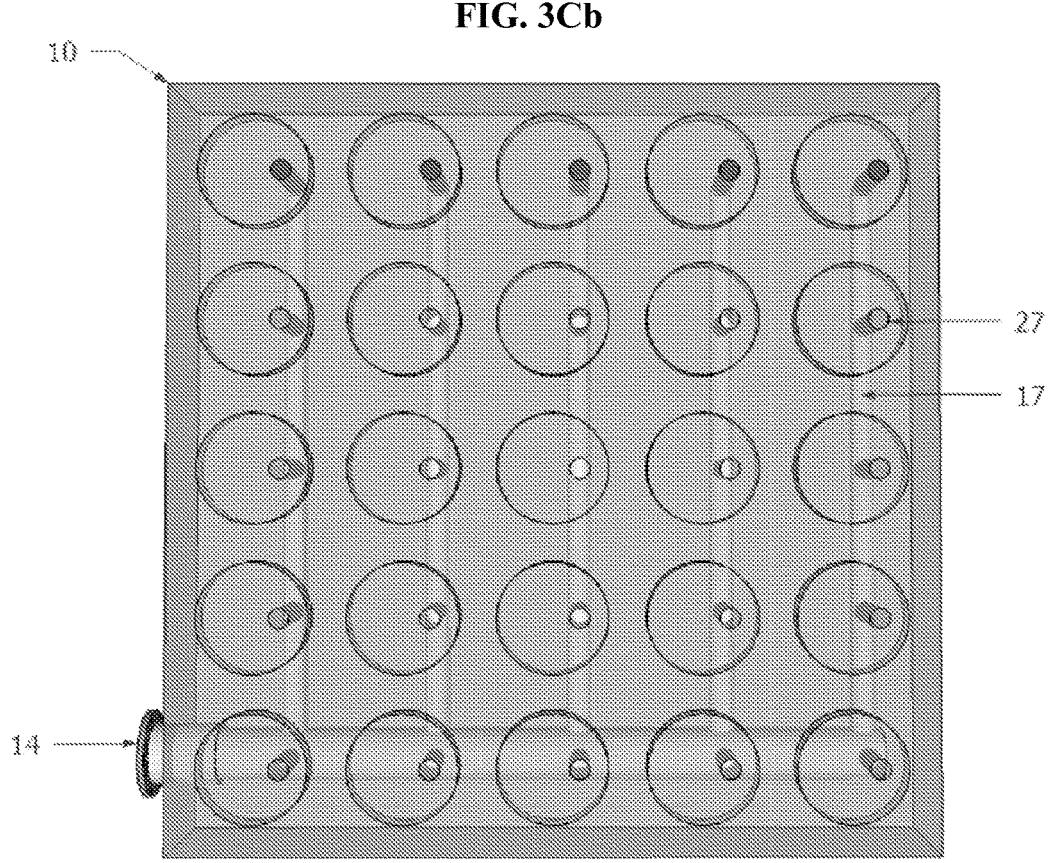
Figure 3D:
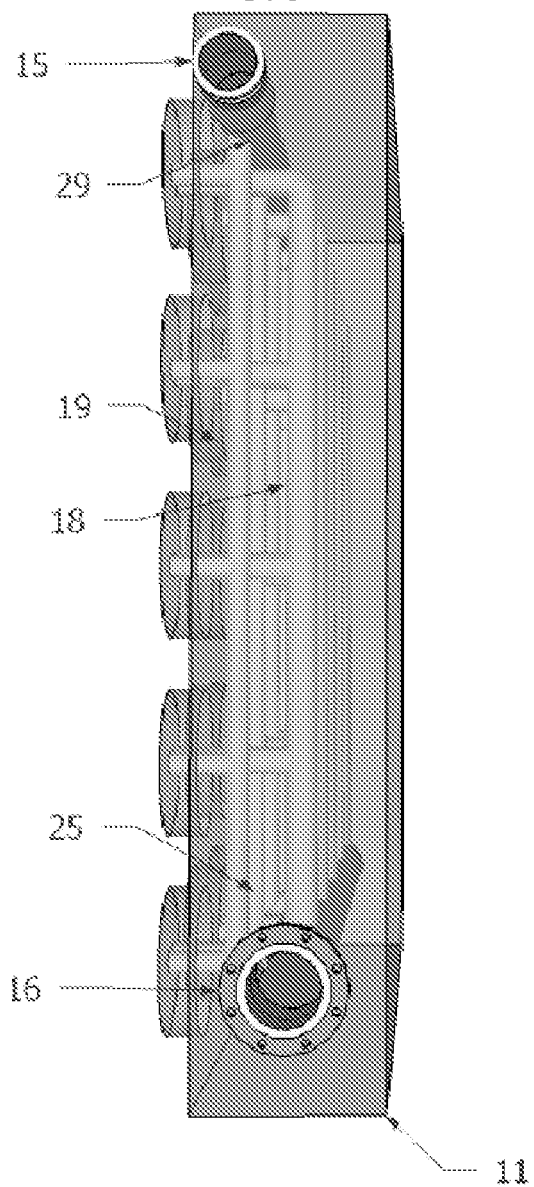
FIG. 3D: Transparent view of the side panel used to collect concentrate and permeate.
Figure 4A:
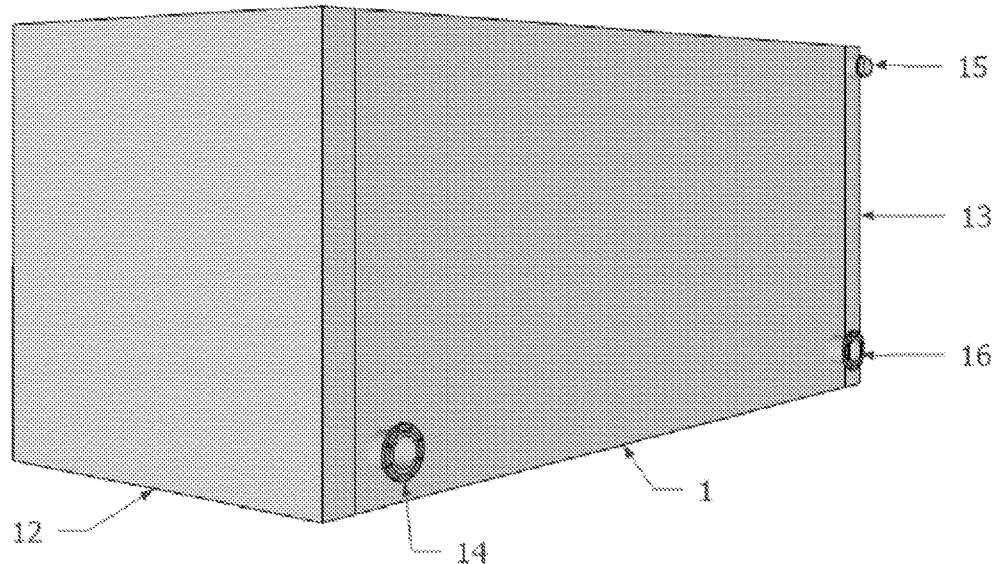
FIG. 4A: 3D view of the complete structure.
Figure 4B:
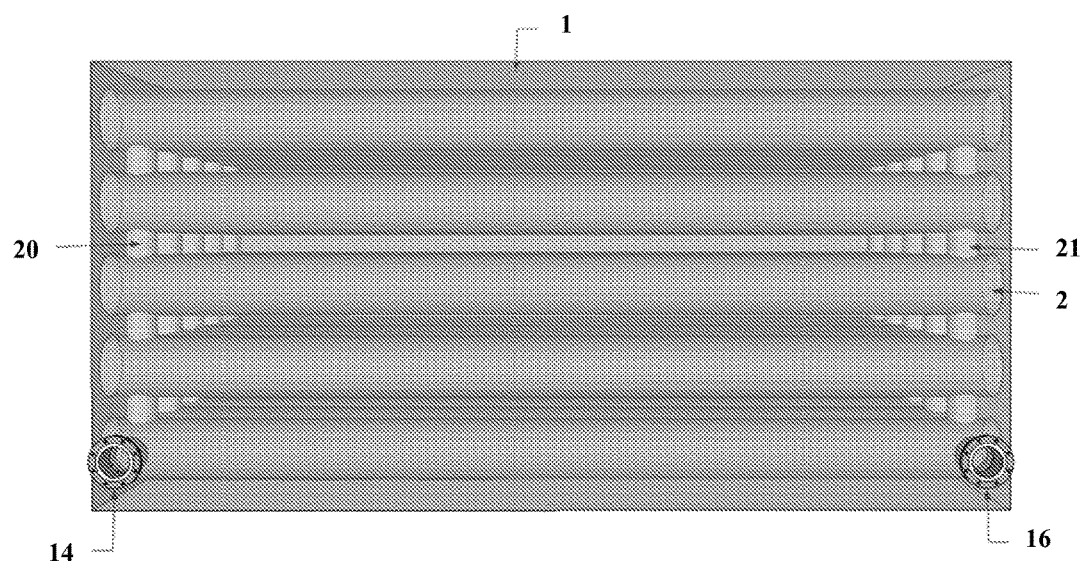
FIG. 4B: Transparent side view of the monobloc showing the 25 passageways and their interconnections through internal channels.
Figure 4C:
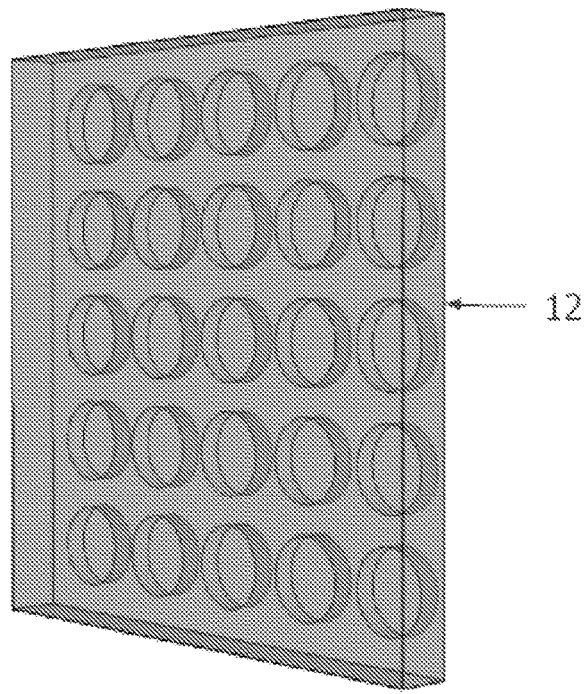
FIG. 4C: Transparent view of the side panel used to seal the upstream side of the monobloc; this side panel does not have any internal channel.
Figure 4D:
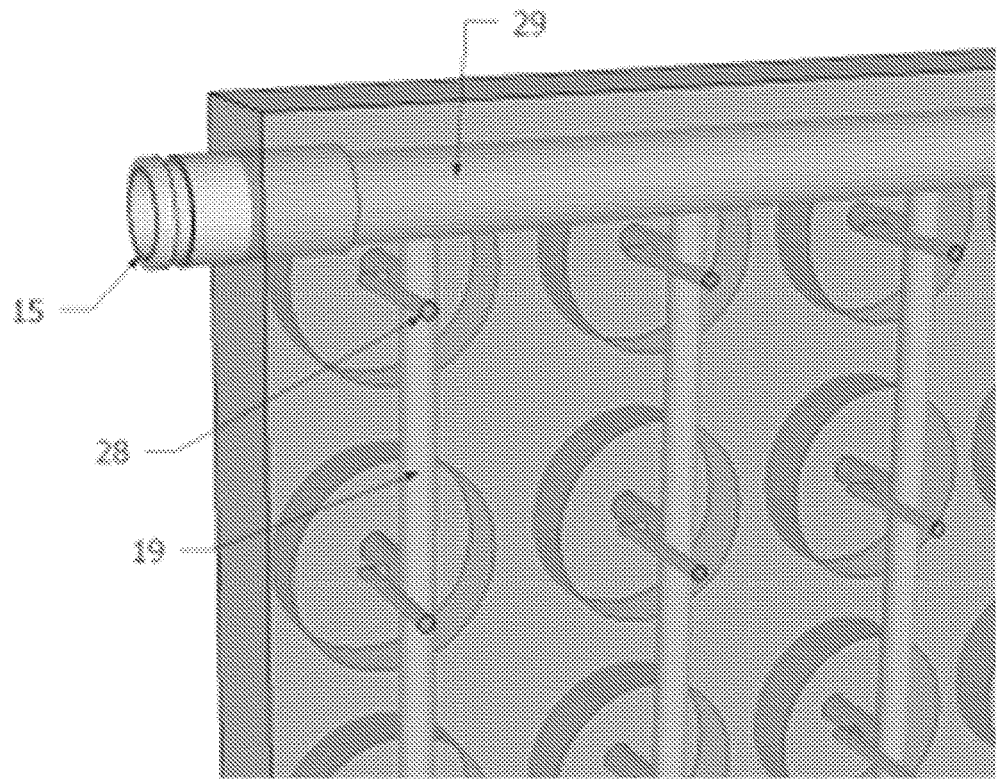
FIG. 4D: Side panel used for collecting permeate.
Figure 4D:
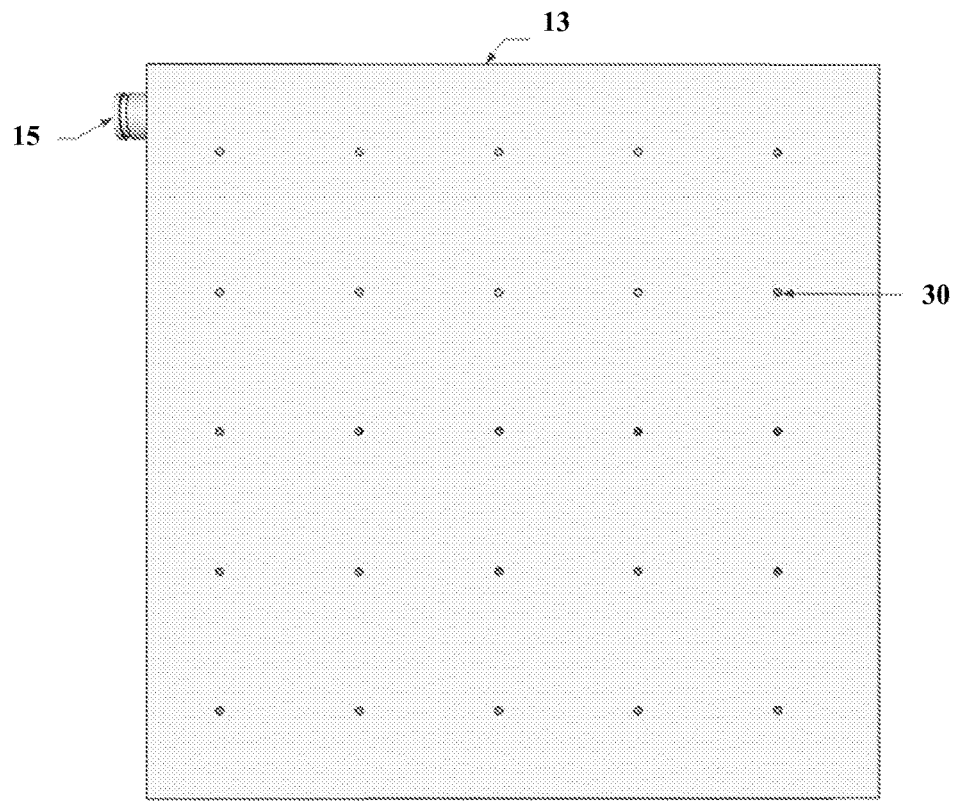
Figure 4D:
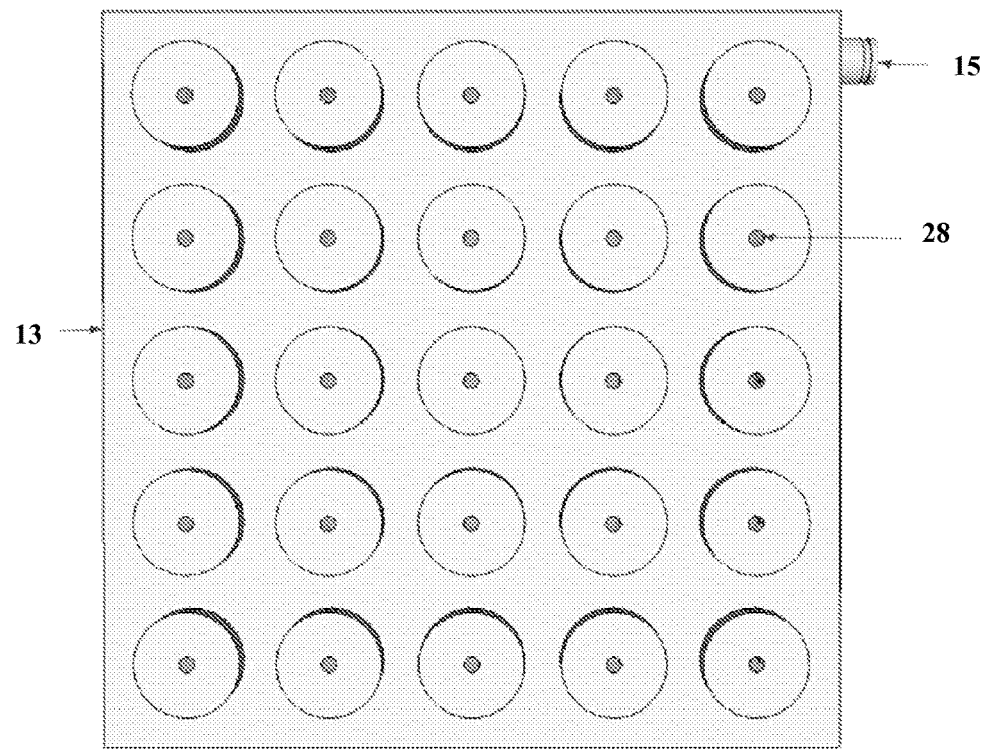

FIG. 2 illustrates such a monobloc 1 with two axial passageways 2 of substantially constant circular cross section throughout their entire lengths. It should be understood that the monobloc is a solid bloc of material in which two or more axial passageways 2 are provided.

In one embodiment both end openings of the passageways are of identical construction such that the monobloc does not need to be oriented in order to be used.

In the embodiment shown, each passageway comprises cylindrical filtration cartridge 3. As well known in this art, generally a cylindrical filtration cartridge contains a central permeate tube 4, around which a semipermeable membrane sheet and an impermeable sheet material are alternatively spirally wound, thus allowing the permeate to flow to the central permeate tube 4.

At each end, an anti-telescoping plate (ATP) 5 is attached; such is also standard in this art to eliminate potential axial shifting of wrappings within the spiral-wound assembly. The central permeate tube 4 is perforated along a major portion of its length; this plurality of holes allow the permeate flowing spirally inward in the semipermeable membrane envelopes to enter the hollow central permeate tube 4, as well known in this art.

In one embodiment, the self-supporting feature of the structures provided herein eliminates any apparent steel support structure. Therefore no more steel frame is visible, as it is currently. This advantage is significant because the apparent steel frames are exposed to a highly corrosive sea atmosphere. Thus, in this embodiment the risk of corrosion on the support frame is completely ruled out.

Moreover, the monobloc feature of the structure, comprising at least two passageways in a single structure, reduces clutter and offers compactness, highly appreciated in industrial applications. Indeed, the gap between each passageway of the present structures is much smaller than the space separating two pressure vessels in the current technology. Thus, with the present structures the footprint of the high-pressure part of the plants using filtration processes can be reduced.

Another embodiment provides a structure wherein the monobloc is built in one single bloc or is an assemblage of several blocs comprising at least one passageway each.

Considering transportation and manufacturing costs, the monobloc 1 may be composed of an assembly of blocs, each containing one or more passageways 2, or can be built directly into a single bloc.

FIGS. 1, 2, 3, 4, 5 and 7 show self-supporting structures having monoblocs 1 constructed from a single block of material. The advantage of building the monobloc 1 from a single block of material is to be free of any subsequent assembly step. However, depending on the materials used, the monobloc 1 can weigh several tons if it is constructed from a single block of material, which can present particular challenges for the transport and handling.

Figure 6A:
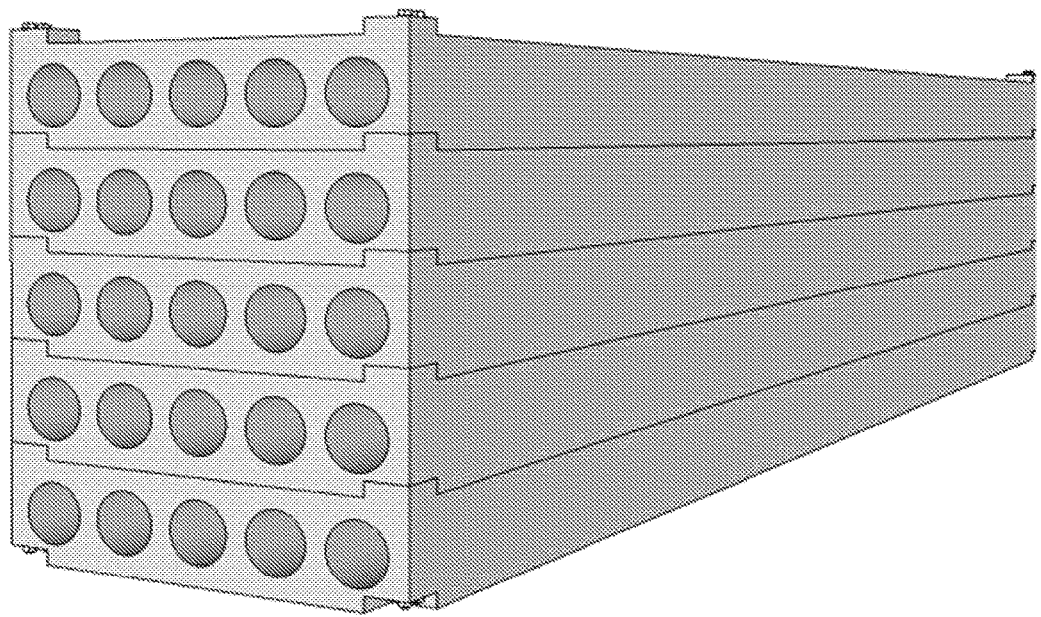
FIG. 6A: Slabs of 5 passageways each assembled together for building a monobloc comprising 25 passageways in total.
Figure 6B:
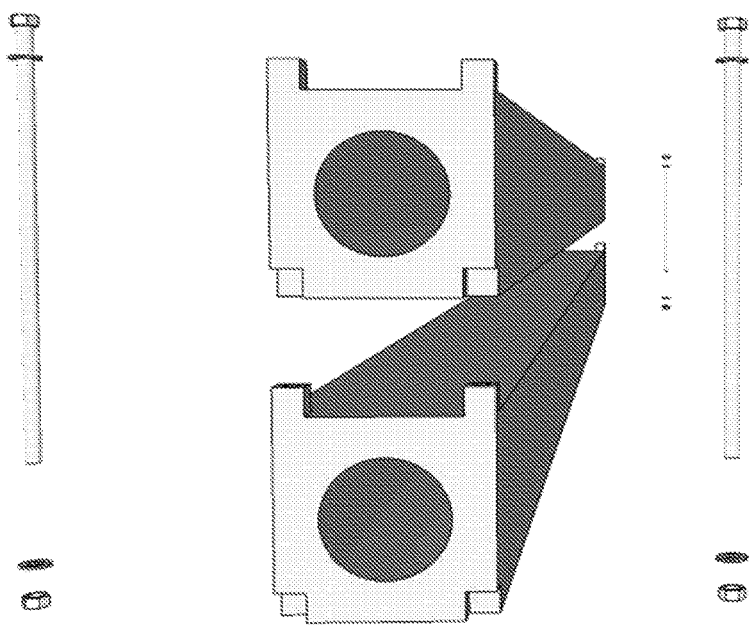
FIG. 6B: Exploded view of blocs comprising 1 passageway each assembled together for building a monobloc comprising 2 passageways in total.
Figure 6C:
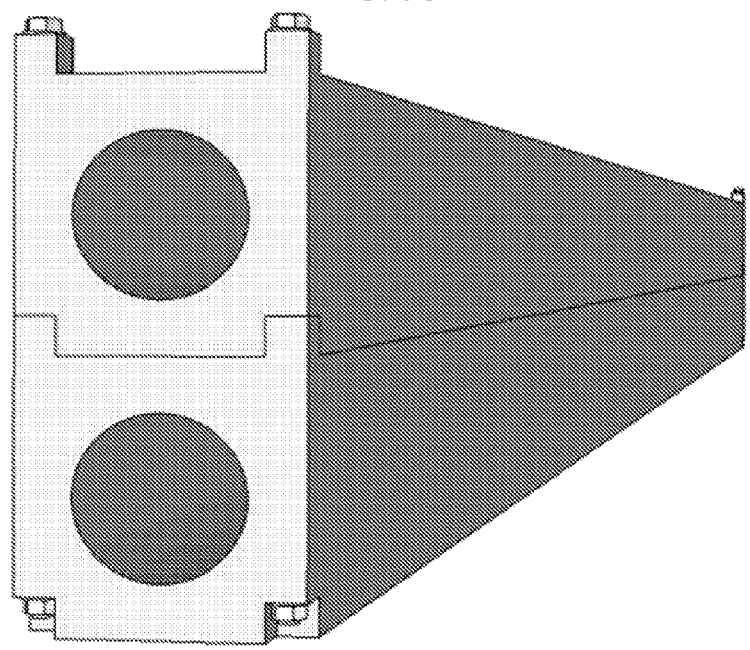
FIG. 6C: Blocs comprising 1 passageway each assembled to together for building a monobloc comprising 2 passageways in total.

FIG. 6 illustrates different options for manufacturing a monobloc 1 composed of an assembly of blocs; one option is to assemble blocs containing one single passageway 2 each, while the second option is to assemble slabs containing five passageways 2 each.

It should be understood that many other options are possible to manufacture the monobloc 1. And that in case the monobloc is an assembly of blocs, a suitable mechanism to hold in place all the blocs together is to be provided. In one embodiment guiding elements would be provided for improved alignment between each bloc.

An example of such a possible mechanism is briefly shown in FIG. 6, however it should be understood that mechanisms and guiding elements of complete different kinds could be provided.

Another embodiment provides a structure wherein at least two cylindrical filtration cartridges are fitted in series in each passageway.

Adjacent cylindrical filtration cartridges 3 are interconnected through standard coupling devices so that all of the permeate tubes 4 in each set of cylindrical filtration cartridges are coupled into a single permeate tube leading to the permeate outlet fitting 7. In this serial arrangement, the concentrate flowing out from a cylindrical filtration cartridge 3 becomes the feed liquid of the next adjacent cylindrical filtration cartridge 3.

Figure 1:
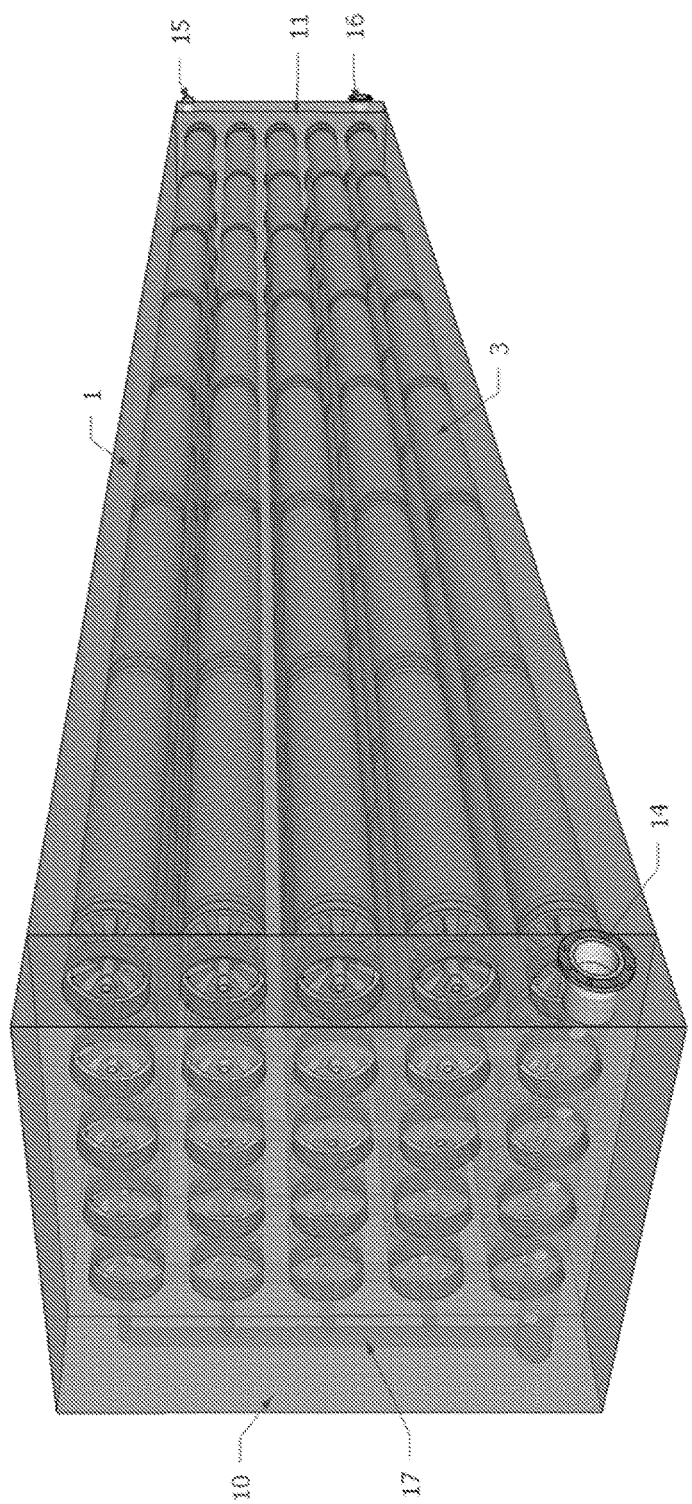
FIG. 1: Transparent view: Structure with a monobloc of 25 passageways in parallel, wherein 7 cylindrical filtration cartridges are fitted in each passageway, and wherein distribution of feed liquid and collection of concentrate and permeate is done within the side panels.

Shown in FIG. 1, for purposes of illustration, are seven cylindrical filtration cartridges 3 that are appropriately interconnected in end-to-end arrangement in each passageway; however, it should be understood that varying numbers of cylindrical filtration cartridges 3 may be used and the length of the monobloc 1 adjusted accordingly.

Another embodiment provides a structure for which two side panels are provided for sealing both end openings of the passageways in a manner to allow the insertion and removal of the cylindrical filtration cartridges.

In one embodiment the end closures 10, 11, 12, 13, 32 or 33 of the monobloc 1 are designed to provide full-bore access to the axial passageway 2 so that cylindrical filtration cartridges 3 can be inserted and removed from either end. The end closures 10, 11, 12, 13, 32 or 33 are designed to seal several passageways or all of the passageways on a same side of the monobloc 1 at the same time, and therefore are commonly called side panels or side plates.

Suitable seals (not shown) are provided between the side panels (or side plates) and the monobloc 1 to prevent any leak at the end opening of the passageways 2.

A suitable mechanism (not shown), being for example high performance slideways, is provided to hold the side panels in closed position, and to allow their opening.

Advantages of these side panels or side plates include providing access to multiple passageways simultaneously which can significantly reduce the manual operations required to install and change the cylindrical filtration cartridges. Indeed, it is not necessary to open each separate pressure vessel, which is a long and tedious operation. Now, with the present structures, dozens of passageways are accessible by opening only one side panel. Therefore maintenance procedures are drastically simplified and shortened, which illustrates a significant gain for the operator of a plant.

Furthermore, the fact of sealing multiple passageways by using only one side panel significantly reduces the number of hydraulic connections, which greatly reduces the risk of leaks. The more the number of hydraulic connections, the greater the risk of leakage. In current technology, if we take the example of a rack with 25 pressure vessels, there are at least 3 connections per pressure vessel, for a total of 75 hydraulic connections. The present structures provide a single connection between each side panel and the central monobloc, for a total of 2 hydraulic connections. The reduction factor is greater than 35; meaning that the risk of leakage is highly reduced.

Without leakage, there is no more production losses or additional corrosion risk. Thus corrective maintenance related to the resolution of the problems of leakage and corrosion is greatly reduced, which illustrates a significant gain for the operator of a plant.

Further, it should be understood that the side panels (or side plates) can be of a whole different shape than the ones shown in the appended figures, provided they achieve their primary function, which is to seal several passageways at the same time. Considering this, the closing mechanism and sealing must be adapted to the actual shape of the side panel (or side plate). The connections between the monobloc 1 and the side panels (or side plates) are subjected to high pressure and should of course contain suitable seals to prevent leakage. All type of effective seals can be used, such as for example, 0-ring seals, elastomeric seals of square cross-section or chevron seals.

Another embodiment provides a structure wherein the feed liquid is introduced, either at one end opening or at the center of the structure, thereby placing a feed side at one end opening or at the center of the structure.

Generally a single feed inlet port 14 is employed to deliver the feed liquid to be treated. This feed inlet port 14 can be located either within the monobloc 1, as shown on FIGS. 4 and 5, or within the side panels, as shown on FIG. 1 and FIG. 3. In case the feed inlet port 14 is located within the monobloc 1 it can be placed either close to one end of the monobloc 1, as shown on FIG. 4, or on a centrally position as shown on FIG. 5.

Regardless the position of the feed inlet port 14, it defines the feed side. Thereby a feed side can be at one end opening of the structure or the center of the monobloc 1.

Another embodiment provides a structure wherein feed liquid is evenly distributed into the passageways through internal channels that are located in the monobloc, or in one of the two side panels.

The feed stream entering the structure through the feed inlet port 14 splits in each passageway 2 creating even feed sub-streams. Interconnections between the passageways 2 are provided such that the single incoming feed stream is distributed to all passageways 2. As a result, the feed stream splits in each passageway 2 and flows axially toward each end of the respective passageway 2, through the cylindrical filtration cartridges 3.

To achieve the interconnections between the passageways different options are possible:

A. Shown in FIG. 1 and FIG. 3, feed liquid is introduced into the structure through the feed inlet port 14 within the side panel 10 wherein internal channels 17 are provided to evenly distribute the feed liquid into each passageway 2. The feed liquid enters the passageways at plenum chambers located on the feed side of the monobloc, and then passes successively through each cylindrical filtration cartridge arranged in series within the passageways. The feed liquid enters the plenum chambers through feed ports 27 located on the side panel 10.

B. Shown in FIG. 4, feed liquid is introduced into the structure through the feed inlet port 14 directly within the monobloc 1 wherein internal channels 20 are provided to interconnect every passageway 2 and evenly distribute the feed liquid into each passageway. The internal channels 20 interconnect the passageways 2 at the plenum chambers where feed liquid enters the passageways 2 before entering successively the cylindrical filtration cartridges 3 arranged in series.

C. In the arrangement shown in FIG. 5, the single feed inlet 14 is located centrally of the monobloc 1 such that the feed liquid is evenly distributed in each passageway 2 of both sides of the monobloc 1 through internal channels 23 and 24, and flows in opposite axial directions through two sets of cylindrical filtration cartridges 3 arranged serially in end-to-end relationship. In this arrangement horizontal internal channels 23 replace the plenum chambers located at the feed side; these horizontal internal channels 23 have in one embodiment a square section, smaller than the diameter of the passageways, so that the cylindrical filtration cartridges 3 are inserted into the passageways 2 abut against this section. The internal channels 24 are vertical and are used to interconnect every internal channel 23.

Regardless of the option chosen to achieve the interconnections between the various passageways 2, the internal channels being located in the monobloc 1 or in the side panels, these internal channels are used to transport and distribute evenly the feed stream in each passageway. As their name implies, all these channels are internal to the structure itself. Thus, in addition to allow installing the cylindrical filtration cartridges 3, the present invention also provides for ensuring uniform distribution of the feed liquid in the different passageways 2.

This advantage is significant because it removes many works of stainless piping. In one embodiment, the different pressure vessels do not need to be connected together by means of stainless pipe. The self-supporting structure, the monobloc and the side panels are constructed to provide this essential function, without requiring additional equipment, and especially without requiring any stainless piping.

Thus, one embodiment eliminates the need for a large number of hydraulic connections through stainless steel piping.

The absence of stainless steel piping greatly reduces capital costs: indeed it is a very expensive material that, in addition, requires specialized skills to be implemented; skills that are also expensive on the labor market. Moreover, the absence of the stainless steel piping also eliminates any risk of corrosion: indeed as stainless as that piping may be, and as expensive as it may be, this piping is still likely to corrode when in contact with sea water or corrosive atmosphere of the sea air.

Thus the absence of stainless steel piping can significantly reduce the costs for currative maintenance related to corrosion problems, as well as preventive maintenance, to reduce the risk of corrosion.

This is a considerable advantage for plant builders, as well as for operators.

Another embodiment provides a structure wherein the feed liquid is directed into the near end of the cylindrical filtration cartridges disposed at the feed side of the passageways;

As shown on FIG. 2, spacers 6 are provided at the two end regions of the passageways, which create short plenum chambers at each end.

On one side, one of these plenum chambers allows the feed liquid to enter the cylindrical filtration cartridge 3 located upstream of the series, while on the other side, it allows to collect the concentrate exiting the last cylindrical filtration cartridge 3 in the series.

In one embodiment, the spacer 6 has a plurality of apertures to allow the passage of liquid radially therethrough between the interior of the plenum chamber and the outer region.

Another embodiment provides a structure wherein the number of passageways is determined according to the flow of feed liquid that can be processed by each of the cylindrical filtration cartridges that are located upstream the passageways.

In one embodiment the cylindrical filtration cartridges 3 have minimum and maximum inlet and concentrate flows; accordingly the number of passageways 2 depends on the inlet flow of feed liquid that has to be treated. This inlet flow of feed liquid divided by the allowable flow rate for each cylindrical filtration cartridge 3 disposed upstream, defines the number of series of cylindrical filtration cartridges 3 to be installed in parallel.

When a series of cylindrical filtration cartridges 3 are installed in a pressure vessel, each pressure vessel is independent from each other. Thus, for example if the feed rate requires 25 series of cylindrical filtration cartridges to be installed in parallel, then 25 pressure vessels will be installed in parallel. Besides the fact that the pressure vessels must be connected to each other by means of stainless steel piping, the pressure vessels should be installed on a support frame, generally made of steel.

The monobloc feature of the structures disclosed herein provides significant advantages. A structure comprising a central monobloc adapts to the number of series of cylindrical filtration cartridges 3 required: if the feed rate requires 15 series of cylindrical cartridges, the monobloc 1 comprises 15 passageways; if it is 25 series, it is 25 passageways. Thus, the present invention adapts to the needs of the filtration process, while limiting the number of components and equipment required to implement this process: whether it is 15 or 25 series of cylindrical filtration cartridges 3 the present invention comprises always one monobloc 1, with two side panels.

It should, of course, be understood that a much larger array than the one shown in the figures could be implemented depending upon the amount of semipermeable membrane surface area felt desirable to carry out daily production at desired rates. To adapt to the high production capacity, structures comprising numerous passageways may be fabricated. However, for reasons of manufacturing, handling, or transportation, several structures each comprising several passageways can be installed in parallel.

Another embodiment provides a structure wherein the concentrate flows out from each of the passageways at the end opening opposite the feed side, or out of both end openings in case the feed side is at the center of the structure.

The concentrate flows out opposite the feed side. Therefore, within the structure, the concentrate flows out at the other end of the set of cylindrical filtration cartridges 3 in each passageway 2, at another plenum chamber opposite the feed side.

Figure 5A:
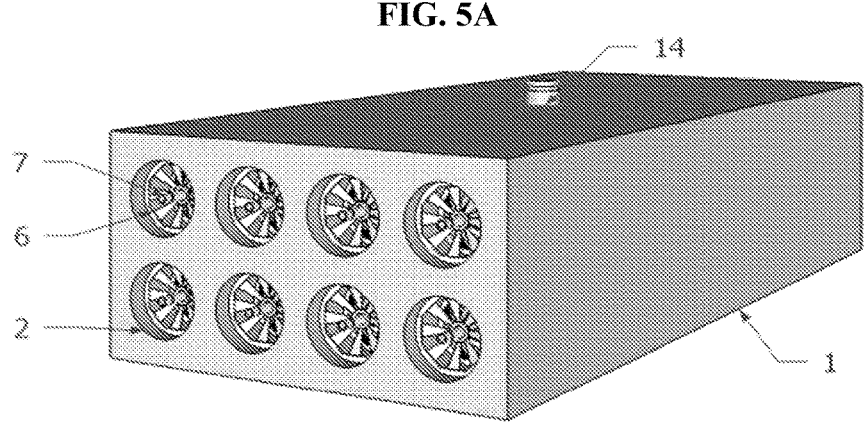
FIG. 5A: 3D view of such a nomobloc.
Figure 5B:
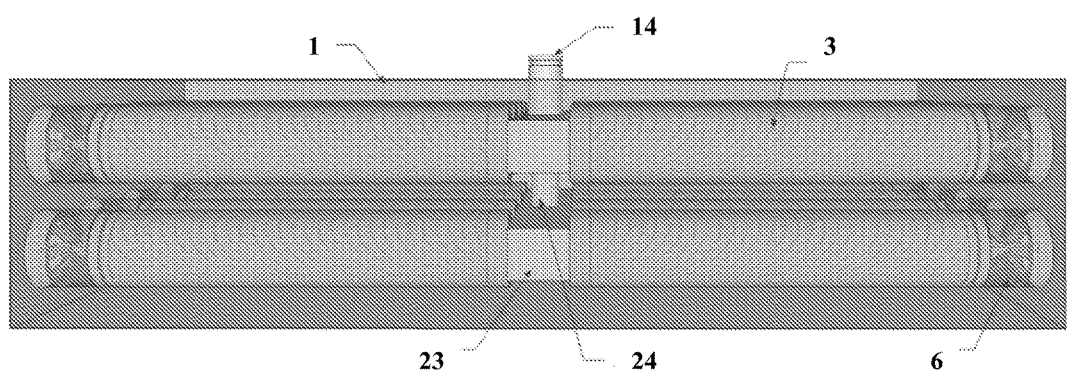
FIG. 5B: Transparent side view of the monobloc showing the internal channels used for feed liquid distribution.

When the feed side is at one end of the monobloc 1, concentrate sub-streams flow out at the opposite end, and there are as many concentrate sub-streams as the number of passageways. When the feed side is at the center of the monobloc 1, as shown in FIG. 5, concentrate sub-streams flow out at both ends of the monobloc 1.

Another embodiment provides a structure wherein the concentrate flowing out from each of the passageways is combined into one common concentrate stream.

The concentrate sub-streams are combined into at least one common concentrate stream. Combination of the concentrate sub-streams is generally similar to the interconnections of the passageways at the feed side:

A. Shown in FIG. 1 and FIG. 3, concentrate sub-streams exit the passageways through concentrate holes 26 located on the side panel 11. Those concentrate holes 26 are connected through internal channels 18 to at least one common concentrate collector 25 located within the side panel 11. The common concentrate collector 25 leads to at least one concentrate outlet port 16.

B. Shown in FIG. 4, the passageways 2 are directly interconnected at the plenum chamber opposite the feed side of the monobloc 1, through internal channels 21. Thus all concentrate sub-streams exit the structure into at least one common concentrate stream through the concentrate outlet port 16 located directly within the monobloc 1.

C. In case the feed inlet port 14 is located centrally of the monobloc 1, as shown in FIG. 5, both previous configurations for concentrate collection can be achieved: either by foreseeing side panels 11 with internal channels 18, or by interconnecting the passageways 2 directly within the monobloc 1 through internal channels 21.

Internal channels are replacing the hydraulic connections made of stainless piping, which is a considerable advantage to reduce capital and operating costs of plants.

Another embodiment provides a structure wherein the permeate flows out of the passageways at either one or the other end opening, regardless of the feed side being located at the center of the structure or at one end opening;

The cylindrical filtration cartridges 3 placed in series are interconnected by the mean of standard coupling devices so that all of the permeate tubes 4 in each set of cylindrical filtration cartridges are coupled into a single permeate tube leading to the permeate outlet fitting 7. It is also well known in this art, that permeate can be collected at either or both ends of the passageways 2, regardless the feed side.

The permeate outlet fitting 7 occupies the central portion of the plenum chamber. It has an inner end portion 8 of tubular shape and proportion that is received within the permeate tube 4 of the cylindrical filtration cartridge 3; the other portion 9 extends through the spacer 6 and is received within the side panels through the permeate holes 28. Both portions carry a suitable sealing device, such as one or more O-rings, in order to seal the connections.

In case the permeate is collected only at one side of the structure, the permeate fitting located at the opposite side, is a blind fitting closed on both end openings so that no liquid can pass through. This blind fitting is of a shorter length than the permeate outlet fitting 7, and would only be connected to the permeate tube 4 in order to seal it.

Another embodiment provides a structure wherein the permeate flowing out from each of the passageways is combined into one common permeate stream.

As for the concentrate, the permeate sub-streams flowing out from each passageway 2 are combined into at least one common permeate stream.

This combination into one common permeate stream is achieved within the side panels 10, 11, 12, 13, 32 or 33, which contain as well the permeate outlet port 15.

A. Shown in FIG. 1 and FIG. 3, the permeate sub-streams are combined into one common permeate collector 29 through internal channels 19 located within the side panel 11. The permeate sub-streams enter the internal channels 19 through the permeate holes 28, in which the permeate tubes 4 are connected. As permeate can be collected from either or both sides, it could also be collected within the side panel 10. As a matter of illustration, in FIG. 1 and FIG. 3, the side panel 10 comprises only internal channels 17 for distributing the feed liquid; however, exactly the same manner the side panel 11 comprises internal channels for concentrate collection 18 and for permeate collection 19, the side panel 10 can also be provided with internal channels for feed distribution 17 and for permeate collection 19.

B. Shown in FIG. 4, in the same manner as previously, the permeate sub-streams are combined into one common permeate collector 29 through internal channels 19 located within the side panel 13. The permeate sub-streams enter the internal channels 19 through the permeate holes 28, in which the permeate tubes 4 are connected. As permeate can be collected from either or both sides, it could also be collected within the side panel 12. As a matter of illustration, in FIG. 4, the side panel 12 does not comprise any internal channel; however, exactly the same manner the side panel 13 comprises internal channels for permeate collection 19, the side panel 12 can also be provided with internal channels for permeate collection 19.

C. In case the feed inlet port 14 is located centrally of the monobloc 1, as shown in FIG. 5, permeate sub-streams exiting each passageway 2, are combined into at least one common permeate collector 29 through internal channels 19 located within both side panels. In this arrangement, depending on the method for collecting concentrate, these side panels can be provided only with internal channels for permeate collection 19, or can be provided with internal channels for both permeate collection 19 and concentrate collection 18.

In this embodiment, the internal channels are replacing the hydraulic connections made of stainless piping, which is a considerable advantage to reduce capital and operating costs of plants.

Another embodiment provides a structure wherein the feed liquid flows through the cylindrical filtration cartridges fitted in the passageways in parallel in order to achieve a single-stage filtration.

In the configurations shown in FIG. 1, FIG. 3, FIG. 4 and FIG. 5, all of the passageways 2 are in parallel arrangement; thereby after the feed liquid is passed through a set of cylindrical filtration cartridges arranged in series within a passageway 2, the concentrate flowing out from this passageway is directed towards the concentrate outlet port 16. Such an arrangement is well known in this art as a single-stage filtration.

Another embodiment provides a structure wherein the monobloc comprises at least two passageways connected in series by internal channels, in order to achieve multi-stage filtration.

Figure 7A:
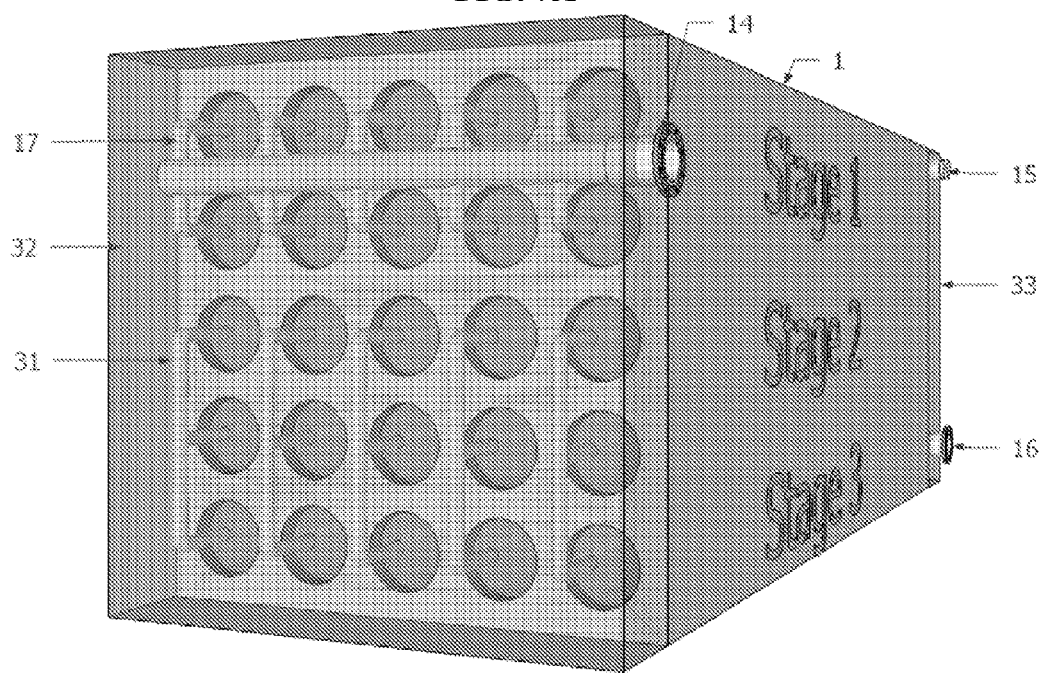
FIG. 7A: 3D view of such a structure with a side panel shown in transparent view. This side panel comprises the feed inlet port to distribute water in the $1^{st}$ stage, and comprises as well inter-stage internal channels between stage 2 and stage 3.
Figure 7B:
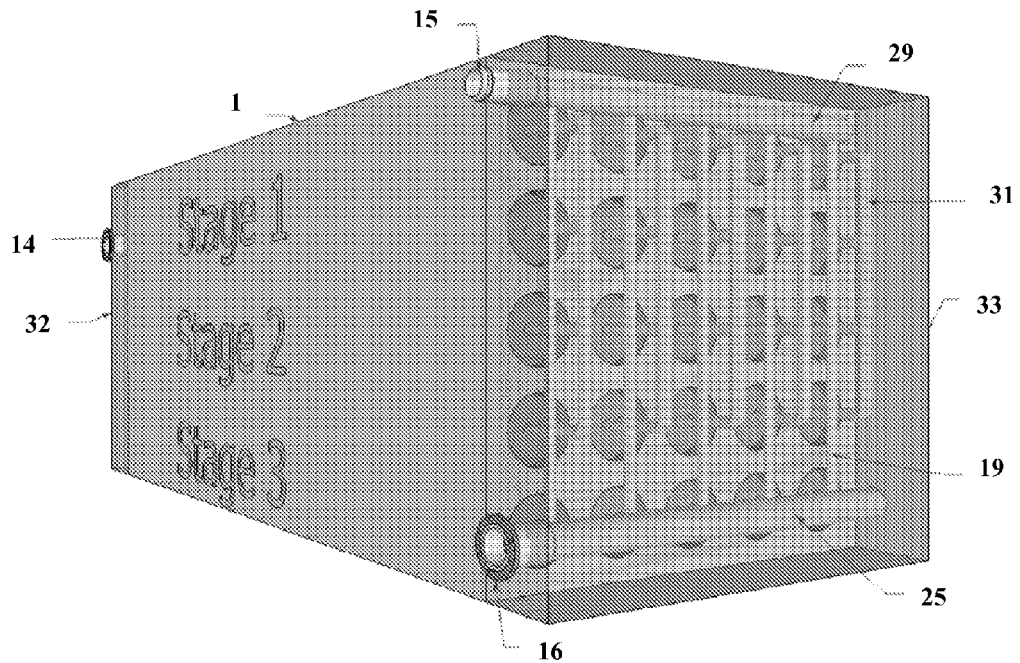
FIG. 7B: 3D view of such a structure with a side panel shown in transparent view. This side panel comprises inter-stage internal channels between stage 1 and stage 2, as well as internal channels for collecting the final concentrate of the last stage, and internal channels for collecting permeate of each passageway and combining those permeate substreams into a common permeate collector.
Figure 8A:
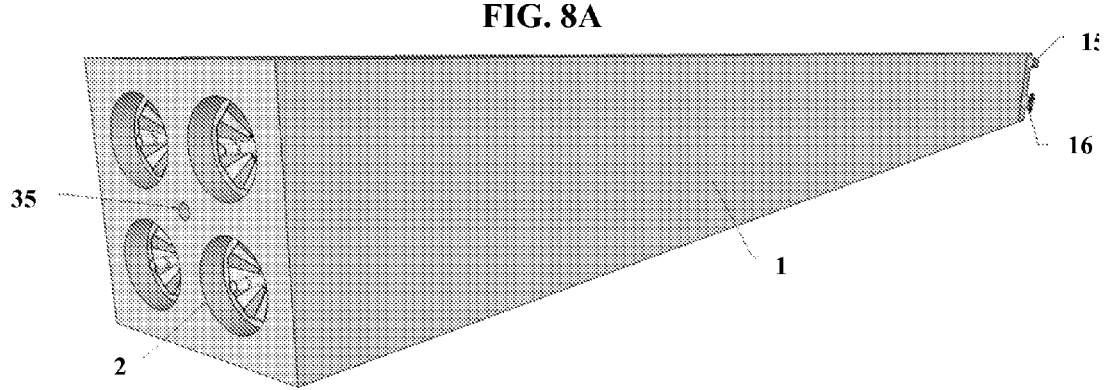
FIG. 8A: 3D view of such a structure comprising a monobloc 1 with four passageways 2 and an internal channel 35 for directing the feed stream to the cylindrical filtration cartridges located in the middle of the series.
Figure 8B:
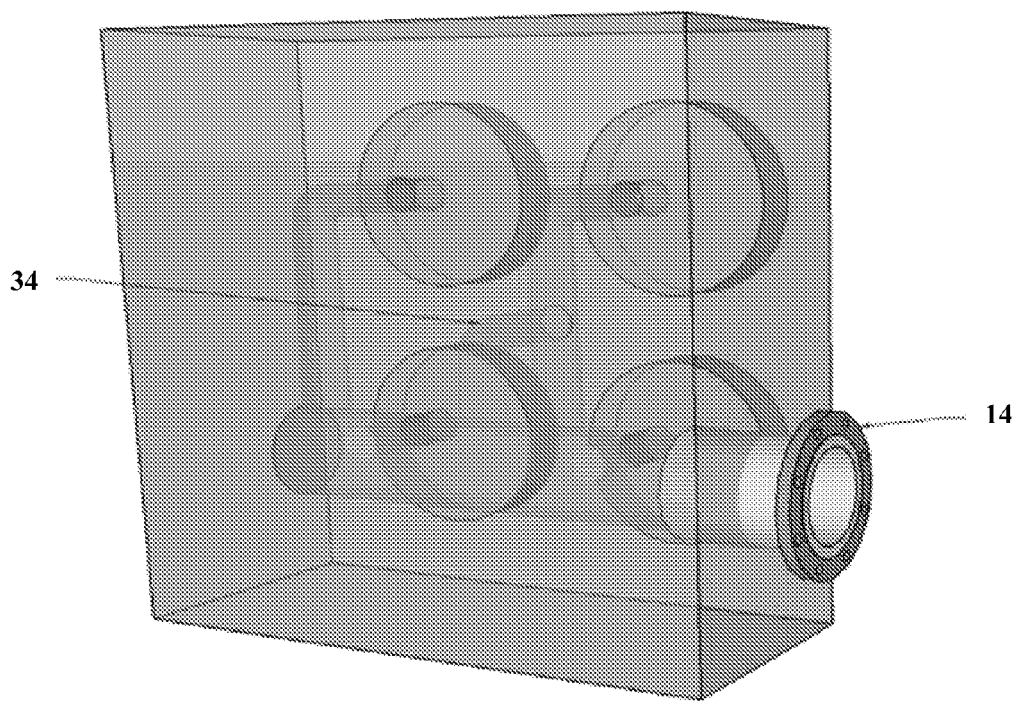
FIG. 8B: Transparent view of the side panel including the feed port 14, all the internal channels for feeding the cylindrical filtration cartridges 3 placed upstream, and an internal channel 34 for directing the feed liquid to the internal channel 35.
Figure 8C:
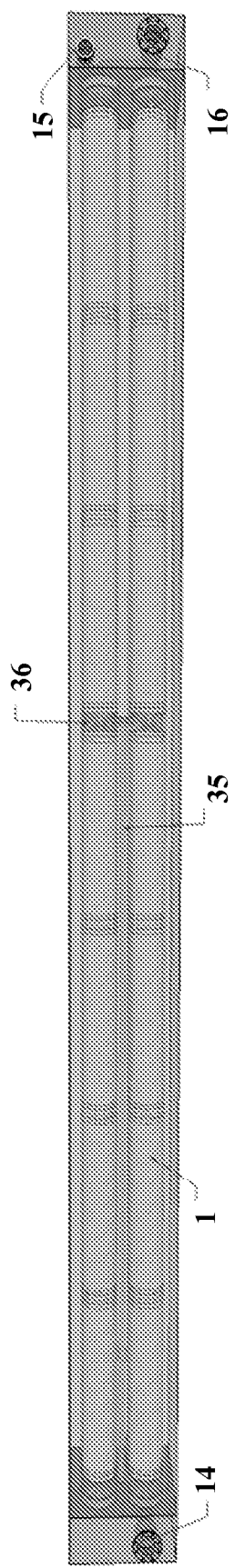
FIG. 8C: Transparent view of such a structure with a monobloc 1 comprising four passageways 2 in which an intermediate plenum chamber 36 allows supplying the feed liquid to the cylindrical filtration cartridges 3 placed in the middle of the series.

In the configuration shown in FIG. 7, the ten passageways 2 located on the two highest levels of the monobloc 1 are arranged in parallel one to each other; those ten passageways constitute the first filtration stage. In the same manner the ten passageways 2 located at the middle of the monobloc 1 are arranged in parallel one to each other; those ten passageways constitute the second filtration stage. And finally, the five passageways 2 located on the lowest level of the monobloc 1 are arranged in parallel one to each other; those five passageways constitute the third filtration stage.

In this configuration the concentrate streams flowing out from one stage constitute the feed liquid of the next stage. In order to direct the concentrate of a previous stage to the feed of a next stage, internal channels are provided either within the monobloc 1 itself, or within the side panels. Finally the concentrate of the last stage is directed towards the concentrate outlet port 16.

Shown on FIG. 7, internal channels 17 feed the first stage within the side panel 32. Internal channels 31 are used to connect the concentrate from a previous stage to the feed of a next stage and are provided within both side panels 32 and 33. Finally concentrate of the third stage exit the structure through the common concentrate collector 25 and the concentrate outlet port 16 within the side panel 33. On this illustration, permeate of the three stages is combined within the common permeate collector 29 within the side panel 33. However permeate can be collected within either or both side panels and permeate of each stage can be collected separately.

Such an arrangement is well known in this art as a multi-stage filtration. As a matter of illustration FIG. 7 shows a structure with 3 stages, however it should be understood that less or more stages could be realized within a same structure.

The internal channels are replacing the hydraulic connections made of stainless piping, which is a considerable advantage to reduce capital and operating costs of plants.

Another embodiment provides a structure wherein the monobloc and/or the side panels comprise at least one internal channel for directing the feed liquid to a plenum chamber located in the middle of the passageways, in order to lower the concentration of the fluid feeding the last cylindrical filtration cartridges of the series. Whether the filtration is mono or multi-stage, whether it is the first or any stage of filtration.

Internal channels 34 or 35 may be provided to direct some feed liquid to the cylindrical filtration cartridges 3 located in the midst of the series. Indeed, it is well known in the art that in a series of cartridges, the concentrate of a cartridge is the feed of the following cartridge. However, the higher the salts concentration of the feed stream of a cartridge, the lower is its recovery rate. Thus, diluting the concentrate of the first cartridges in the series, within a plenum chamber 36 used for mixing the concentrate with feed raw liquid, lowers the salt concentration of the feed stream for the following cartridges.

This dilution, for lowering the salt concentration of the intermediate feed streams within the series of cartridges, can increase the overall recovery rate of the series of cartridge.

Increasing the conversion rate of the series of cartridges, while keeping the same operating conditions of pressure and flow rate is a significant benefit for plant operators as it reduces operating costs accordingly.

Today all operators being eager to reduce their operating costs, the advantage provided by the present invention is very important.

Another embodiment provides a structure wherein the material used for its construction allows the structure to withstand operating conditions comprising:
  A. nominal superatmospheric pressure: up to 1500 psi;
  B. feed liquid salinity: up to 60 ppm; and/or
  C. use of strong acid and caustic.

The structure comprising the monobloc 1 and the different side panels 10, 11, 12, 13, 32 or 33 can be made of any suitable material that has the strength and stability to withstand the superatmospheric pressure to which the passageways 2 and the internal channels 17, 18, 20, 21, 23, 24, 25 or 29 will be subjected during operation. Generally the superatmospheric pressure during normal operation can be up to 1500 psi.

In one embodiment, the structure is made using a material that can withstand the physical and chemical aggressions which it will be subjected in operation; generally, this means a salinity of feed liquid up to 60 ppm and the use of strong acids and strong caustics.

Another embodiment provides a structure wherein the monobloc and the side panels are made of corrosion-resistant alloys, plastic materials, composites, polymers, resins, concrete, or nano-materials.

Stainless steel or other corrosion-resistant alloys, plastic or thermoplastic materials, composites, resins, polymers, or nano-materials could be used.

However, although all the previous materials may be used, the most popular construction for a structure of this type today is that of concrete material, e.g. high performance fiber-reinforced concrete.

In one embodiment the monobloc 1 and the different side panels 10, 11, 12, 13, 32 or 33 of a same structure can be made with different materials; for example the monobloc being in high performance fiber-reinforced concrete and the side panels being in PVC.

In addition it should be understood that the monobloc 1 and the different side panels do not have to be built using only one material; for example the monobloc 1 can be built using high performance fiber-reinforced concrete and PVC at the same time.

Another embodiment provides a structure wherein the materials are fiber-reinforced.

The materials used for the construction of the structure comprising the monobloc 1 and the different side panels can be free of any reinforcement or can be fiber-reinforced.

Another embodiment provides a structure wherein the materials comprise adjuvants; those adjuvants may contain nanoparticles or not.

The materials used for the construction of the structure comprising the monobloc 1 and the different side panels can comprise adjuvants in order to increase the physical or chemical resistance of the material. Those adjuvants may also contain nanoparticles.

Another embodiment, provides an internal frame disposed in the monobloc and/or the side panels, in order to reinforce the mechanical strength.

The materials used for the construction of the structure comprising the monobloc 1 and the various side panels can be reinforced by an inner armature. This reinforcement may be continuous or discontinuous. In one embodiment, this frame is made of steel, however any material for manufacturing a frame to strengthen the structure of the present invention may be used.

Another embodiment provides a structure wherein the diameter of the passageways is determined by the diameter of the cylindrical filtration cartridges, such that the annular seals surrounding the cylindrical filtration cartridges provide sealing between the periphery areas of each cylindrical filtration cartridge and an inner surface of the structure that defines the passageways, thereby forcing the feed liquid to pass into the cylindrical filtration cartridges.

The passageways 2 are of a diameter so as the cylindrical filtration cartridges 3 are closely accommodated within the passageways 2 of the monobloc 1.

In some embodiments the upstream end of each cylindrical filtration cartridge 3 contains a chevron or other suitable seal 30 surrounding the outer perimeter of the ATP, which may be seated in a peripheral groove. In one embodiment seals are provided at each end of each cartridge. This seal ensures that the entire feed stream is directed axially through the cylindrical filtration cartridges 3 fitted in the passageways 2, and does not bypass the cartridge passing outside thereof.

Another embodiment provides a structure wherein the length of the monobloc depends on the number of cylindrical filtration cartridges to be placed in series in the passageways.

The length of the monobloc 1 depends on the number of cylindrical filtration cartridges 3 placed in series within the passageways 2.

For example, to accommodate seven cylindrical filtration cartridges 3 each having individual length of about 40 inches, a monobloc 1 must have an overall length in the neighborhood of 300 inches, including both plenum chambers at each end that are each approximately 5 inches in length.

Another embodiment provides a structure wherein the width and the height of the structure depend on the number of passageways within the structure and their diameters, and depend as well on the material used for its construction.

The width and the height of the structure, including the monobloc 1 and the different side panels, depend on the number of passageways 2 that are within the monobloc 1 and their diameters.

The specifications of the material used for building the monobloc 1 have also an impact on the width and the height of the structure. Indeed depending on the strength of the material used, the material thickness between each passage can vary in order to minimize deformations related to the operating conditions under superatmospheric pressure of the structure.

For example, to accommodate cylindrical filtration cartridges 3 having a diameter of 8 inches into 25 passageways 2, as shown in FIG. 1, within a monobloc built in high performance fiber-reinforced concrete, the width and the height of the structure would be in the neighborhood of 60 inches.

The monobloc nature of the present invention provides a very advantageous compactness since the spacing between each passageway 2 can be reduced to a minimum. Thus, the present invention helps to reduce the footprint of the equipment needed to install cylindrical filtration cartridges 3. On a large scale, this advantage is considerable.

Another embodiment provides a structure for which:
A. The feed liquid is introduced into the structure through at least one feed entry port, so that a pipe or an isolation valve can be connected to it.
B. The common concentrate stream is linked to at least one concentrate exit port, so that a pipe, an isolation valve or a regulation valve can be connected to it.
C. The common permeate stream is linked to at least one permeate exit port, so that a pipe or an isolation valve can be connected to it.

The feed inlet port 14, the permeate outlet port 15 and the concentrate outlet port 16 are of a type such that a pipe or a valve can be connected to it.

As a matter of illustration, the feed inlet port 14 is a grooved port for the installation of a grooved connector such as the ones commonly used in this art, and well known under the manufacturer name Victaulic.

As a matter of illustration, the permeate and the concentrate outlet ports 15 and 16 are provided with a flange such that a pipe or a valve can be screwed on it.

However, it should be understood that other types of port could be provided, and that the ports 14, 15 and 16 can all be of the same type or of a different one. Furthermore, the ports 14, 15 and 16, should facilitate the interface between the present invention and the rest of the plant. Thus, these ports will be adapted to the general environment of the plants and will be of a common and habitual type for such a plant.

In any case, those ports have an inner portion inlaid within the material of the structure and an outer portion on which a pipe or a valve can be connected to it. The inner portion may simply be a short section of tubing which have the same internal diameter as the diameter of the internal channel on which it is connected, in such a way that the inside surface of the tube is flush with the interior surface of the channel.

Except the interfaces between the monobloc in central position and the side panels, it should be understood that these three ports are the only ports and hydraulic connections apparent in the system. Indeed, all other connections are internal to the structure, and carried out through internal channels.

As discussed above, the fact to significantly reduce the number of hydraulic connections, dramatically reduces the risk of leakage, which helps to sharply reduce maintenance costs of the plants.

Another embodiment provides a structure for which sample ports are provided on either or both side panels, in order to install sample valves that will be used to take permeate samples separately on each permeate sub-stream flowing out from each passageway.

In order to control the qualitative parameters of permeate produced in each passageway, sample ports 30 are provided within the side panels wherein permeate is collected in order to be able to sample each permeate sub-stream separately. These ports are of a type such that it is possible to insert a sampling tube to independently collect the permeate exiting from each cylindrical filtration cartridge arranged in a passageway. This sampling tube must allow to be introduced into the central permeate tube, to collect the permeate exiting the cylindrical filtration cartridge upstream of the series, downstream, or any other position of the series.

As shown on FIG. 4 those ports are located on the outside part of the concerned side panels and are connected to each permeate sub-streams through internal channels.

Those ports are from such a type that standard sample valves can be connected to them; for example a simple screw thread such that a sample valve could be screwed into it.

Another embodiment provides a structure wherein tappings are made either in the monobloc or in the side panels in order to install instrumentation for controlling all the qualitative and quantitative parameters of the feed liquid, the concentrate or the permeate.

In order to control the qualitative and quantitative parameters of the feed liquid, the concentrate, or the permeate, such as for example, the flow, the pressure or the conductivity, tappings (not shown) are provided within the monobloc 1 or within the side panels.

Those tappings are directly connected to the different internal channels and are from such a type that standard instrumentation can be connected to them; for example a simple screw thread such that a pressure gauge could be screwed into it.

One embodiment provides a method for treating a feed liquid having suspended and/or dissolved solids by using a single-stage cross-flow filtration to create a permeate stream and a concentrate stream; Such a method comprises the following steps:
A. feeding a stream of such liquid through a feed entry port 14 located either on the monobloc 1 or on the side panels;
B. splitting the feed stream into even feed sub-streams; the number of feed sub-streams is equal to the number of passageways 2 within the monobloc 1;
C. introducing each feed sub-stream into a passageway 2;
D. directing each feed sub-stream into the near end of the cylindrical filtration cartridges 3 disposed at the feed side of each passageway 2; feed sub-streams may also be directed into the near end of any cylindrical filtration cartridge 3 disposed within the series;
E. separately collecting the concentrate sub-streams exiting from each cylindrical filtration cartridge 3 at the end opening opposite the feed side of each passageway 2;
F. combining together all the concentrate sub-streams into at least one common concentrate stream;
G. separately collecting the permeate sub-streams exiting from the cylindrical filtration cartridges 3 at either or both end openings of the passageways 2;
H. combining together every permeate sub-streams into at least one common permeate stream.

According to another embodiment, the feed liquid having suspended and/or dissolved solids is treated using a multi-stage cross-flow filtration to create a permeate stream and a concentrate stream; such a method comprises the following steps:
A. feeding a stream of such liquid through a feed entry port 14 located either on the monobloc 1 or on the side panels;

B. splitting the feed stream into even feed sub-streams; the number of feed sub-streams is equal to the number of passageways 2 within the monobloc 1 that are used for the first stage;
C. introducing each feed sub-stream into a passageway 2 used for the first stage;
D. directing each feed sub-stream into the near end of the cylindrical filtration cartridges 3 disposed at the feed side of the passageways 2 used for the first stage; feed sub-streams may also be directed into the near end of any cylindrical filtration cartridge 3 disposed within the series used for the first stage;
E. separately collecting the inter-stage concentrate sub-streams exiting from each cylindrical filtration cartridge 3 at the end opening opposite the feed side of each passageway 2 used for the first stage;
F. combining together all the inter-stage concentrate sub-streams into at least one common inter-stage concentrate stream;
G. splitting the common inter-stage concentrate stream into even inter-stage sub-streams; the number of inter-stage concentrate sub-streams is equal to the number of passageways 2 within the monobloc 1 that are used for the next stage;
H. introducing each inter-stage concentrate sub-stream into a passageway 2 used for the next stage;
I. directing each inter-stage concentrate sub-stream into the near end of the cylindrical filtration cartridges 3 disposed at the feed side of the passageways 2 used for the next stage; feed sub-streams may also be directed into the near end of any cylindrical filtration cartridge 3 disposed within the series used for the next stage;
J. separately collecting the final concentrate sub-streams exiting from each cylindrical filtration cartridge 3 at the end opening opposite the feed side of each passageway 2 used for the final stage;
K. combining together all final concentrate sub-streams into at least one common final concentrate stream;
L. separately collecting the permeate sub-streams exiting from the cylindrical filtration cartridges 3 at either or both end openings of each passageway 2 used for any stage;
M. combining together every permeate sub-streams into at least one common permeate stream;
N. operations e. to i. can be repeated many times so multi-stage filtration can be achieved.

Although the invention has been described with regard to certain preferred embodiments which constitute the best mode know to the inventors at the present time for carrying out this invention, it should be understood that various changes and modifications as would be obvious to one having the ordinary skill in this art may be made without departing from the scope of the invention which is defined by the claims appended thereto.

The invention claimed is:

1. A self-supporting structure comprising a monobloc having at least two axial passageways extending between opposite end openings; wherein at least one cylindrical filtration cartridge is fitted in each passageway, so a feed liquid having dissolved and/or suspended therein components flows through the cylindrical filtration cartridges to create a permeate stream and a concentrate stream which are both separately collected;
   wherein the material used for construction of the monobloc allows the structure to withstand operating conditions comprising:
   a. nominal superatmospheric pressure: up to 1500 psi;
   b. feed liquid salinity: up to 60 ppm; and/or
   c. use of strong acid and caustic;
   and wherein:
   (i) the monobloc is built in one single bloc or is an assemblage of several blocs comprising at least one passageway;
   (ii) two side panels are provided for sealing end openings of the passageways in a manner to allow the insertion and removal of cylindrical filtration cartridges; and
   (iii) an internal frame is provided within the monobloc and/or the side panels, in order to reinforce the mechanical strength of the structure.

2. The structure according to claim 1 wherein at least two cylindrical filtration cartridges are fitted in series in each passageway.

3. The structure according to claim 1 configured so that the feed liquid is introduced, either at one end opening or at the center of the structure, thereby placing a feed side at one end opening or at the center of the structure.

4. The structure according to claim 1 wherein the number of passageways is determined according to the flow of the feed liquid that can be processed by each of the cylindrical filtration cartridges that are located upstream the passageways.

5. The structure according to claim 1 wherein the structure is configured so that feed liquid is evenly distributed into the passageways through internal channels that are located in the monobloc or in one of the side panels.

6. The structure according to claim 1 wherein the structure is configured so that concentrate flowing out from each of the passageways is combined into one common concentrate stream.

7. The structure according to claim 1 wherein the structure is configured so that permeate flowing out from each of the passageways is combined into one common permeate stream.

8. The structure according to claim 1 wherein the feed liquid flows through the cylindrical filtration cartridges fitted in the passageways in parallel in order to achieve a single-stage filtration.

9. The structure according to claim 1 wherein the monobloc comprises at least two passageways connected in series by internal channels, in order to achieve multi-stage filtration.

10. The structure according to claim 1, wherein the monobloc and/or the side panels comprise at least one internal channel for directing the feed liquid to a plenum chamber located at the middle of the passageways, in order to lower the concentration of the fluid feeding the last cylindrical filtration cartridges of the series, whether the filtration is mono or multi-stage, whether it is the first or any stage of filtration.

11. The structure according to claim 1, wherein the monobloc and the side panels are made of corrosion-resistant alloys, plastic materials, composites, polymers, resins, concrete, or nano-materials.

12. The structure according to claim 11 wherein the materials are fiber-reinforced.

13. The structure according to claim 11 wherein the materials comprise adjuvants; those adjuvants may contain nanoparticles or not.

14. The structure according to claim 1, wherein the diameter of the passageways is determined by the diameter of the cylindrical filtration cartridges, such that the annular seals surrounding the cylindrical filtration cartridges provide sealing between the periphery areas of each the cylindrical filtration cartridges and an inner tubular surface of the structure that defines the passageways, thereby forcing the feed liquid to pass through the cylindrical filtration cartridges.

15. The structure according to claims 1, wherein the width and the height of the structure depend on the number of the passageways within the structure and their diameters, and depend as well on the material used for its construction.

16. The structure according to claim 1 for which:
- A. The feed liquid is introduced into the structure through at least one feed entry port, so that a pipe or an isolation valve can be connected to it
- B. The common concentrate stream is linked to at least one concentrate exit port, so that a pipe, an isolation valve or a regulation valve can be connected to it
- C. The common permeate stream is linked to at least one permeate exit port, so that a pipe or an isolation valve can be connected to it.

17. The structure according to claim 1, for which sample ports are provided on either or both side panels, in order to install sample valves that will be used to take permeate samples separately on each permeate sub-stream flowing out from each the passageway.

18. The structure according to claim 1, wherein tappings are made either in the monobloc or in the side panels in order to install instrumentation for controlling qualitative and quantitative parameters of the feed liquid, the concentrate or the permeate.

* * * * *